(12) United States Patent
Arora et al.

(10) Patent No.: US 11,847,858 B2
(45) Date of Patent: Dec. 19, 2023

(54) VEHICLE OCCUPANT ENGAGEMENT USING THREE-DIMENSIONAL EYE GAZE VECTORS

(71) Applicant: Google LLC, Mountain View, CA (US)

(72) Inventors: Ankit Arora, San Jose, CA (US); Blaze Michael Keller, San Francisco, CA (US); Guru Nagarajan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/054,102

(22) Filed: Nov. 9, 2022

(65) Prior Publication Data

US 2023/0088021 A1    Mar. 23, 2023

Related U.S. Application Data

(63) Continuation of application No. 16/764,313, filed as application No. PCT/US2019/061025 on Nov. 12, 2019, now Pat. No. 11,527,082.
(Continued)

(51) Int. Cl.
*G06V 40/19* (2022.01)
*G06T 7/73* (2017.01)
(Continued)

(52) U.S. Cl.
CPC ............... *G06V 40/19* (2022.01); *G06T 7/74* (2017.01); *G06V 10/143* (2022.01); *G06V 10/25* (2022.01);
(Continued)

(58) Field of Classification Search
CPC ................................. G06T 7/74; G06V 20/597
See application file for complete search history.

(56) References Cited

U.S. PATENT DOCUMENTS

| 6,154,559 A | 11/2000 | Beardsley |
| 2007/0230797 A1 | 10/2007 | Hisanaga |

(Continued)

FOREIGN PATENT DOCUMENTS

| EP | 0990416 A1 | 4/2000 |
| JP | 2000113186 A | 4/2000 |

(Continued)

OTHER PUBLICATIONS

Cudalbu et al., "Driver monitoring with a single high-speed camera and IR illumination", Jul. 2005, ISSCS, pp. 219-222 (Year: 2005).*
(Continued)

*Primary Examiner* — Edward Park
(74) *Attorney, Agent, or Firm* — Shumaker & Sieffert, P.A.

(57) ABSTRACT

According to the techniques of this disclosure, a method includes capturing, using a camera system of a vehicle, at least one image of an occupant of the vehicle, determining, based on the at least one image of the occupant, a location of one or more eyes of the occupant within the vehicle, and determining, based on the at least one image of the occupant, an eye gaze vector. The method may also include determining, based on the eye gaze vector, the location of the one or more eyes of the occupant, and a vehicle data file of the vehicle, a region of interest from a plurality of regions of interests of the vehicle at which the occupant is looking, wherein the vehicle data file specifies respective locations of each of the plurality of regions of interest, and selectively performing, based on the region of interest, an action.

20 Claims, 11 Drawing Sheets

Related U.S. Application Data

(60) Provisional application No. 62/862,561, filed on Jun. 17, 2019.

(51) Int. Cl.
    *G06V 40/16*         (2022.01)
    *G06V 20/59*         (2022.01)
    *G06V 10/25*         (2022.01)
    *G06V 10/143*       (2022.01)

(52) U.S. Cl.
    CPC .......... *G06V 20/597* (2022.01); *G06V 40/171* (2022.01); *G06T 2207/10048* (2013.01); *G06T 2207/20081* (2013.01); *G06T 2207/30201* (2013.01); *G06T 2207/30268* (2013.01)

(56) References Cited

U.S. PATENT DOCUMENTS

| | | | |
|---|---|---|---|
| 2012/0147328 A1* | 6/2012 | Yahav | A61B 3/113 351/210 |
| 2017/0120749 A1 | 5/2017 | Dias et al. | |
| 2018/0005525 A1* | 1/2018 | Parundekar | G08G 1/0967 |
| 2021/0042520 A1* | 2/2021 | Molin | G06V 40/18 |

FOREIGN PATENT DOCUMENTS

| | | |
|---|---|---|
| JP | 2007265367 A | 10/2007 |
| JP | 2017516219 A | 6/2015 |
| KR | 101795264 B1 | 12/2017 |
| KR | 20180100865 A | 9/2018 |
| KR | 1020180100865 A | 9/2018 |
| WO | 2005052851 A2 | 6/2005 |
| WO | 2015166059 A1 | 11/2015 |

OTHER PUBLICATIONS

Communication pursuant to Article 94(3) EPC from counterpart European Application No. 19836702.1 dated Jan. 2, 2023, 6 pp.
Carapencea et al., "Real-Time Gaze Tracking With A Single Camera," Journal of Information Systems and Operations Management, vol. 9, No. 1, Jan. 1, 2015, pp. 37-49.
Cudalbu et al., "Driver Monitoring with a Single High-Speed Camera and IR Illumination," International Symposium on Signals, Circuits and Systems, Jul. 14-15, 2005, pp. 219-222.
Prosecution History from U.S. Appl. No. 16/764,313, dated May 14, 2020 through Aug. 24, 2022, 77 pp.
Decision of Rejection from counterpart Korean Application No. 10-2020-7016245 dated Feb. 8, 2022, 6 pp.
Decision of Rejection, and translation thereof, from counterpart Japanese Application No. 2020-529676 dated Sep. 20, 2022, 15 pp.
Goodfellow et al., "Deep Learning," MIT Press, 2016 (Applicant points out, in accordance with MPEP 609.04(a), that the year of publication, 2016, is sufficiently earlier than the effective U.S. filing date, so that the particular month of publication is not in issue.) 806 pp.
International Preliminary Report on Patentability from International Application No. PCT/US2019/061025, dated Dec. 30, 2021, 9 pp.
International Search Report and Written Opinion of International Application No. PCT/US2019/061025, dated Feb. 27, 2020, 15 pp.
Machine translation of JP2017516219, espacenet, accessed Apr. 29, 2022, pp. 1-18 (Year: 2022).
Murphy, "Machine Learning: A Probabilistic Perspective," Massachusetts Institute of Technology, 2012 (Applicant points out, in accordance with MPEP 609.04(a), that the year of publication, 2012, is sufficiently earlier than the effective U.S. filing date, so that the particular month of publication is not in issue.) 1098 pp.
Notice of Grounds of Rejection, and translation thereof, from counterpart Japanese Application No. 2020-529676 dated Dec. 7, 2021, 46 pp.
Office Action and Search Report, and translation thereof, from counterpart Korean Application No. 1020207016245, dated Jul. 30, 2021, 18 pp.
Response to Communication pursuant to Rules 161(1) and 162 EPC from European Patent Application No. 19836702.1, dated Jan. 22, 2021, filed Jun. 29, 2021, 8 pp.
Russell et al., "Artificial Intelligence: A Modern Approach," Prentice-Hall, Inc., 1995 (Applicant points out, in accordance with MPEP 609.04(a), that the year of publication, 1995, is sufficiently earlier than the effective U.S. filing date, so that the particular month of publication is not in issue.) 946 pp.
Sutton et al., "Reinforcement Learning: An Introduction," The MIT Press, 2015 (Applicant points out, in accordance with MPEP 609.04(a), that the year of publication, 2015, is sufficiently earlier than the effective U.S. filing date, so that the particular month of publication is not in issue.) 352 pp.
Zinkevich, "Rules of Machine Learning: Best Practices for ML Engineering," retrieved from http://martin.zinkevich.org/rules_of_ml/rules_of_ml.pdf on Sep. 2, 2020, 24 pp.
Response to Communication pursuant to Article 94(3) EPC dated Jan. 2, 2023, from counterpart European Application No. 19836702.1 filed Apr. 19, 2023, 14 pp.
Office Action, and translation thereof, from counterpart Japanese Application No. 2020-529676 dated Jun. 27, 2023, 6 pp.

* cited by examiner

VEHICLE OCCUPANT ENGAGEMENT USING THREE-DIMENSIONAL EYE GAZE VECTORS

RELATED APPLICATION

This application is a continuation of U.S. application Ser. No. 16/764,313, filed May 14, 2020, which is a 371 Application of International Application No. PCT/US2019/061025, filed Nov. 12, 2019, which claims benefit of Provisional Application No. 62/862,561, filed Jun. 17, 2019, the entire contents of each of which are incorporated herein by reference.

BACKGROUND

Vehicles with semi-autonomous driving features are becoming more common. Vehicles may include features that help keep the vehicle within lane boundaries, guide the vehicle around corners, or automatically accelerate and brake based on the presence of other vehicles. While these driving assistance features are helpful when used appropriately, some drivers are relying upon these features to fully control the vehicle for various periods of time. The driver may be interacting with a head unit of the vehicle, looking at scenery out the window, looking at a mobile phone, eating, or performing other tasks rather than actively driving the vehicle. Unfortunately, as these driving assistance systems are designed to require user interactions, inattentive drivers may cause accidents.

SUMMARY

In general, this disclosure is directed to techniques for enabling a computing system to determine whether a user is engaged with driving a vehicle or is paying attention to something else using three-dimensional eye gaze vectors within a three-dimensional vehicle cabin space. Rather than requiring a user to touch a steering wheel, determining that a driver's eyes are open, analyzing facial expressions, or blink speed, the techniques of this disclosure may enable the computing system to more precisely determine a location within the vehicle the user is looking and determine what is physically located at that the location within the vehicle. For example, the computing system may determine a location of an occupant's head and/or eyes within a three-dimensional vehicle cabin and determine three-dimensional eye gaze vectors based at least in part on a facial plane of the occupant. Using the three-dimensional placement of the occupant's head/eyes within the cabin space and the three-dimensional eye gaze vectors, the computing system may more precisely determine a location within the three-dimensional cabin space at which the user is looking, such as a rearview mirror, a head unit of the vehicle, an instrument display of the vehicle, a front windshield of the vehicle, etc. In some instances, the computing system may determine that the occupant is looking at something outside of the vehicle (e.g., because the location at which the occupant is looking is associated with a window). In such instances, the computing system may determine if the occupant is looking out a side window and, thus may not be paying sufficient attention to driving the vehicle. Using the location at which the user is looking, the computing system may take various safety-related or other actions (e.g., taking a picture of what the user is looking at outside the window, limiting the driver's ability to interact with a head unit of the vehicle without limiting a passenger's ability to interact with the head unit, evaluating how well a driver is abiding by the rules of the road, etc.).

In this way, techniques of this disclosure may enable the computing system to more precisely determine where an occupant of a vehicle is looking so as to better ascertain the occupant's engagement level with the vehicle. By more precisely determining where the occupant is looking, the computing system may not only determine whether or not the occupant is paying attention to the road, but the computing system may also perform various other actions related to the object at which the occupant is looking. Thus, an eye gaze detection system as described herein may enable the computing system to provide additional functionality as compared to typical driver attention systems.

The details of one or more examples are set forth in the accompanying drawings and the description below. Other features, objects, and advantages of the disclosure will be apparent from the description and drawings, and from the claims.

DETAILED DESCRIPTION

Figure 1:
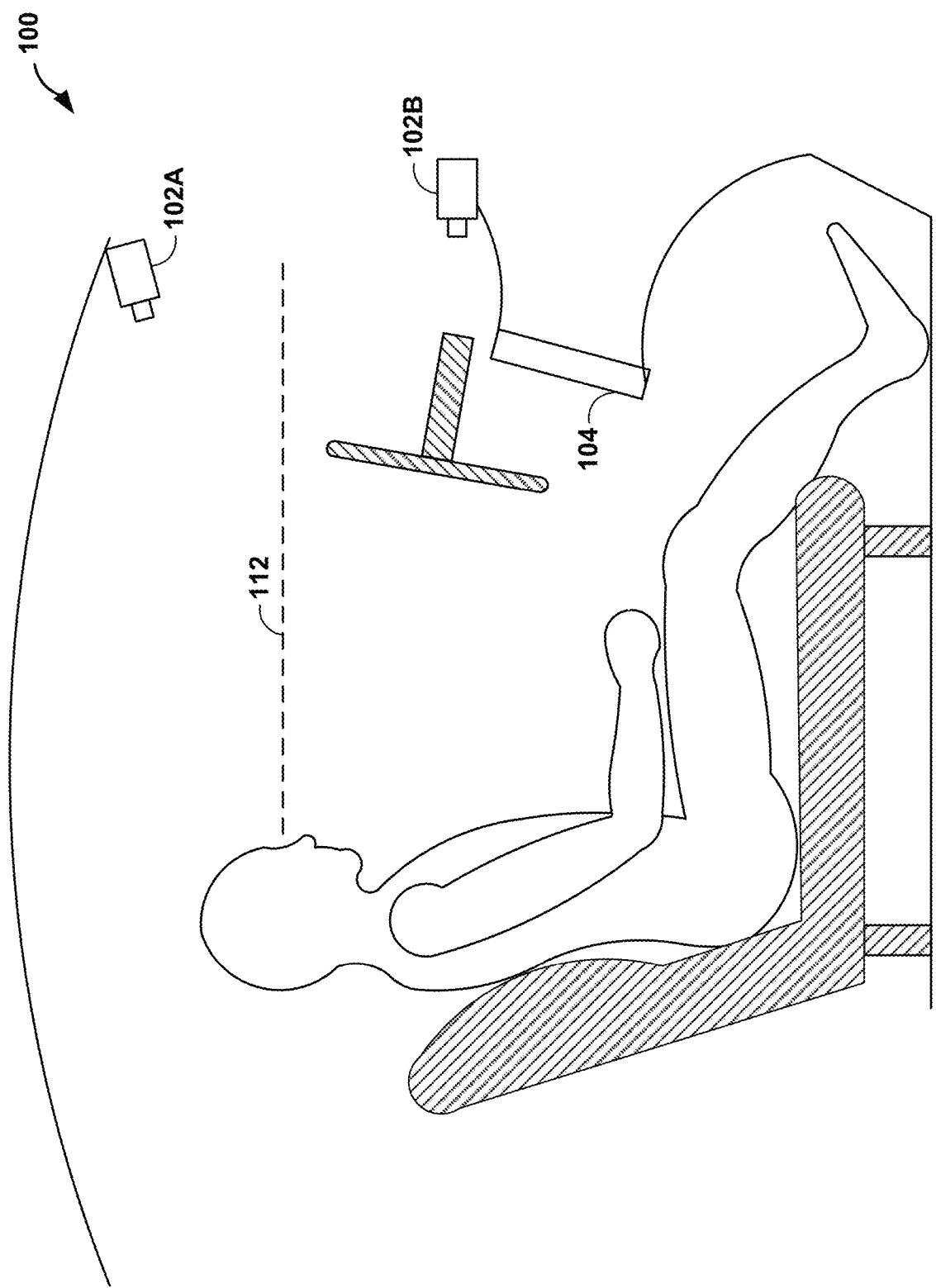
FIG. 1 is a conceptual diagram illustrating an interior of a vehicle that includes an example vehicle computing system configured to determine driver engagement using three-dimensional eye gaze vectors, in accordance with one or more aspects of the present disclosure.

FIG. 1 is a conceptual diagram illustrating an interior of a vehicle that includes an example vehicle computing system configured to determine driver engagement using three-dimensional (3D) eye gaze vectors, in accordance with one or more aspects of the present disclosure. FIG. 1 shows a cross-sectional view of an interior of vehicle 100 (also referred to herein as a "cabin" of vehicle 100) in addition to cameras 102A and 102B (collectively, "cameras 102"), and vehicle computing system 104. The vehicle illustrated in FIG. 1 may be an automobile, but aspects of the present disclosure may also be applicable to other types of vehicles, including trucks, motorcycles, aircraft, watercraft, trains, or other vehicles. In FIG. 1, a driver may normally occupy the seat and other passenger seats may be positioned behind or next to the seat.

Cameras 102 may be one or more of any appropriate type of image acquisition device, such as a camera or charge-coupled device. In some examples, cameras 102 may be one or more infrared cameras with a high field-of-view and shallow depth of focus, and may be a backlit infrared camera oriented to point generally towards one or more seats of vehicle 100. In other examples, cameras 102 may be or may further include one or more other types of cameras or image sensors, which may include one or more other infrared cameras, thermographic cameras, thermal imaging cameras, light-sensitive cameras, range sensors, depth cameras, tomography devices, radar devices, or ultrasonic cameras. In some examples, cameras 102 may be any image capture device appropriate for application of computer vision techniques. Depending on the type of sensors or cameras used, the resulting image may include two-dimensional images, three-dimensional volumes, or an image sequence. Pixel values typically correspond to light intensity in one or more spectral bands, but might also be related to various physical measures, such as depth, absorption or reflectance of sonic or electromagnetic waves, or nuclear magnetic resonance. While only two cameras 102 are shown in FIG. 1, vehicle 100 may include more than two cameras 102 positioned within the interior of vehicle 100 and techniques of this disclosure may use any number of images captured by any number of cameras 102.

In general, vehicle computing system 104 may operate to assist, inform, entertain, or perform other tasks that require user interactions with occupants of a vehicle. Vehicle computing system 104 may be referred to as a vehicle head unit, an infotainment system, or a subcomponent thereof. For example, vehicle computing system 104 may execute various applications that perform functions or process information, on behalf of one or more occupants of the vehicle. For instance, vehicle computing system 104 may provide a navigation service that provides directions to destinations. Vehicle computing system 104 may also provide an information retrieval service that provides information in response to queries and/or as preemptive assistance or recommendations. Vehicle computing system 104 may also provide vehicle data about the vehicle, or multimedia such as audio or video. Mentioned are only a few examples of the functionality that may be provided by vehicle computing system 104, and vehicle computing system 104 may provide many additional capabilities. In this and other ways, vehicle computing system 104 may improve the driving or riding experience for one or more occupants of the vehicle.

Using images captures by cameras 102, the camera system and/or vehicle computing system 104 may determine a location of an occupant within the interior of vehicle 100 and may determine a 3D eye gaze vector of the occupant (e.g., 3D eye gaze vector 112). Cameras 102 may capture images of an occupant of vehicle 100 as the occupant is driving vehicle 100 (e.g., the driver of vehicle 100). In some instances, cameras 102 may include cameras that capture images of other occupants of vehicle 100. Cameras 102 may be part of a camera system that includes at least one or more processors and a memory. The images captured by cameras 102 may be analyzed by the camera system or vehicle computing system 104 or both. In various examples, techniques described herein relating to vehicle computing system 104 may also be performed by the computing system in whole or in part.

In order to place the occupant's head and/or eyes within the interior of vehicle 100, vehicle computing system 104 determines a distance from one or more of cameras 102 to the occupant's eyes (or head) using the images captured by one or more of cameras 102. In some instances, at least two of cameras 102 capture an image of the occupant. Vehicle computing system 104 may analyze the parallax angles between the images given that the location of each of the at least two cameras 102 is known. Using the parallax angles and the distance between the cameras, vehicle computing system 104 determines the distance between one or more of the at least two cameras 102 and the occupant's eyes. As another example, one of cameras 102 may be an infrared camera. Using a single one of cameras 102, vehicle computing system 104 may analyze the distortion of the image captured by the infrared camera to determine the distance between the infrared camera 102 and the occupant's eyes.

Using this determined distance between cameras 102 and the occupant's eyes as well as the location of the occupant's eyes in the captured images, vehicle computing system 104 may place the occupant's eyes in 3D space relative to cameras 102. That is, vehicle computing system 104 and/or the camera system may determine a location of the occupant's eyes within the interior of vehicle 100 relative to one or more of cameras 102. The location of the occupant's eyes is a location within a 3D space defined relative to one or more of cameras 102. For example, the 3D space may be spherical and have a centroid that corresponds to a location of one of cameras 102. The location of the occupant's eyes, in such examples, may be defined in terms of (x,y,z) coordinates where (0,0,0) is the location of the one of camera 102 that is being used as the centroid of the sphere. Such a coordinate may be referred to as being located within a "camera-based coordinate system."

Vehicle computing system 104 may also track the eye of the occupant of vehicle 100. For example, using cameras 102, vehicle computing system 104 may track the eye position and movement of the occupant across multiple different images captured by cameras 102. Using the eye position and movement of a pupil or other features of the eye (i.e. eye tracking), vehicle computing system 104 may determine a first initial 3D eye gaze vector. However, in various instances, the occupant's eyes may be occluded and, thus, the images captured by cameras 102 may not include a clear image of the occupant's eyes. Thus, rather than just relying upon tracking the position and movement of the occupant's eyes, vehicle computing system 104 may further analyze the captured images to determine a facial plane of the occupant.

In calculating the facial plane of the occupant, vehicle computing system 104 may identify a plurality of facial landmarks in one or more images captured by one or more of cameras 102. Facial landmarks may include edges of a mouth, eyes, nose, ears, eyebrows, jaw, or other facial features. Using the identified facial landmarks, vehicle computing system 104 may determine if the occupant's face included in image exhibits any pitch, roll, or yaw based on a geometric consistency between the various facial landmarks. For example, if the distances between the occupant's two eyes relative to the overall distance between the occupant's mouth and eyes is smaller than when the occupant is looking straight ahead, vehicle computing system 104 determines that the occupant is looking to the left or right. If vehicle computing system 104 determined that the image includes a right ear of the occupant but not a left ear of the occupant, vehicle computing system 104 determines that the occupant is looking to the left. The pitch, roll, and yaw angles of the facial plane may be determined based on the relative change in distances between facial landmarks. Using the pitch, roll, and yaw angles of the determined facial plane, vehicle computing system 104 may determine a second initial 3D eye gaze vector. As described herein, pitch, roll, and yaw may refer a rotation of a user's head about a particular axis. In general, roll may refer to a head that is rotated about its vertical axis, which is also referred to as rotating the head from side to side. Pitch may refer to a user moving his or her head up and down, as if the person were nodding. Yaw may refer to a user rotating his or her head side to side through a vertical axis and with the rotation being in line with a horizontal plane running one ear of the user to the other.

In various instances, vehicle computing system 104 may apply a trained machine learning model to the image to determine the facial plane. The machine learning model may be trained using images of other people having the facial landmarks already identified and the facial plane angle already determined. The machine learning model may continually learn based on user feedback and feedback provided by vehicle computing system 104. For example, vehicle computing system 104 may rank or adjust the parameters of the machine learning model based on the first initial 3D eye gaze vector determined using eye tracking as compared to the second 3D eye gaze vector determined using the facial plane. Additional details of how the machine learning system may operate is described below with respect to FIGS. 6A-6E.

Once the first and second initial 3D eye gaze vectors are determined, vehicle computing system 104 may determine, based on both the first and second initial 3D eye gaze vectors, 3D eye gaze vector 112 of the occupant. In various instances, vehicle computing system 104 may determine 3D eye gaze vector 112 using an average of the first and second initial 3D eye gaze vectors. Vehicle computing system 104 may, in other examples, apply a weighting to one or more of the first and second 3D eye gaze vectors and use the weighted values to determine 3D eye gaze vector 112. Vehicle computing system 104 may determine weights to apply to the first and second initial 3D eye gaze vectors based on a confidence that the first or second initial 3D eye gaze vector was accurately determined. For example, if vehicle computing system 104 detected only a portion of the facial landmarks (e.g., just the eyes and nose, but no mouth or jaw), there may be an increased error range for the pitch, roll, and yaw angles of the facial plane. As such, vehicle computing system 104 may apply a reduced weighting value to the second initial 3D eye gaze vector and an increased weighting value to the first initial 3D eye gaze vector determined using eye tracking.

While described as requiring both the first and second initial 3D eye gaze vectors, vehicle computing system 104 may also determine 3D eye gaze vector 112 using one of the first and second initial 3D eye gaze vectors. For example, if the occupant's eyes are closed in the image captured by cameras 102 or the occupant is wearing sunglasses, vehicle computing system 104 may use the second initial 3D eye gaze vector (i.e., the 3D eye gaze vector determined based on the pitch, roll, and yaw of the facial plane of the occupant) as 3D eye gaze vector 112. As another example, if the image captured by cameras 102 include the occupant's face partially obscured (e.g., by the occupant's hand), vehicle computing system 104 may use the first initial 3D eye gaze vector (i.e., the 3D eye gaze vector determined using eye tracking) as 3D eye gaze vector 112.

Rather than or in addition to vehicle computing system 104 determining 3D eye gaze vector 112, the camera system may determine 3D eye gaze vector 112. That is, rather than vehicle computing system 104 receiving one or more images from cameras 102, the camera system may analyze the images (e.g., within each of cameras 102 or using a computing device distinct from vehicle computing system 104), determine 3D eye gaze vector 112 and provide the values of 3D eye gaze vector 112 to vehicle computing system 104. In some instances, the camera system determines the first and second initial 3D eye gaze vectors and provide those to vehicle computing system 104. Vehicle computing system 104 may then determine 3D eye gaze vector 112 using the first and second initial 3D eye gaze vectors received from the camera system.

Vehicle computing system 104, using 3D eye gaze vector 112 and the location of the occupant's eyes relative to one or more of cameras 102, determines one or more regions of interest at which the occupant is looking. In order to make such a determination, vehicle computing system 104 determines where 3D eye gaze vector 112 intersects with one or more locations of the interior of vehicle 100. As one example, vehicle 100 may be different from a second example vehicle 100, vehicle computing system 104 is provided with a vehicle-specific data file. The vehicle data file includes a respective set of coordinates for each region of interest in the interior of vehicle 100, where each of the respective set of coordinates are defined relative to a centroid of the interior of the vehicle (i.e., using the vehicle-based coordinate system) and each of the respective coordinate sets define a two-dimensional plane for the region of interest. Further, by using vehicle data files that define interior features of various vehicles, techniques of this disclosure may be more easily applied across a wide variety of vehicles without requiring a programmer to customize the calculations for each different vehicle.

As the location of the occupant's may initially be determined relative to one or more of cameras 102 (i.e., within the camera-based coordinate system), vehicle computing system 104 may transform the initial location coordinates of the occupant's eyes to a set of coordinates defined relative to the centroid specified in the vehicle data file. That is, rather than using the coordinates for a sphere defined relative to one or more of cameras 102, vehicle computing system 104 adjusts the location of the occupant's eyes to define the location relative to a centroid of a sphere that encompasses the interior of vehicle 100. Coordinate locations within the sphere that encompasses the interior of vehicle 100 and has a centroid located somewhere other than a location of one of cameras 102 may be referred to herein as having coordinates within the "vehicle-based coordinate system." In some instances, the centroid of vehicle-based coordinate system may be located at a center point of the interior of vehicle 100. In other instances, the centroid may be located at a central point in space between the driver's seat and the dashboard or steering wheel of vehicle 100.

The vehicle data file may define the location of one or more cameras 102 within vehicle 100 (e.g., in terms of (x,y,z) coordinates) using the vehicle-based coordinate system. Vehicle computing system 104 uses the coordinate location of the one or more cameras 102 and the coordinate location of the occupant's eyes defined using the camera-based coordinate system and generates a new coordinate location of the occupant's eyes in the vehicle-based coordinate system.

Using the vehicle-based coordinate system location of the occupant's eyes, vehicle computing system 104 projects 3D eye gaze vector 112 out from the occupant's eyes until it intersects with a plane associated with a region of interest. Vehicle computing system 104 determines that the plane that is intersected by 3D eye gaze vector 112 is the region of interest at which the occupant of vehicle 100 is looking. As shown in FIG. 1, 3D eye gaze 112 is projected out towards the windshield of vehicle 100. Thus, vehicle computing system 104 may determine that the occupant is looking out the windshield of vehicle 100 and is engaged with driving vehicle 100.

In some instances, vehicle computing system 104 may periodically or continually determine at which region of interest the occupant of vehicle 100 is looking over time. By monitoring which regions of interest the occupant is looking at, vehicle computing system 104 may determine a level of engagement of the occupant and may determine how well the occupant is following the rules of the road and safe driving best practices. For example, if the occupant changes lanes without looking at a sideview mirror or reverses vehicle 100 without looking out the rear window, vehicle computing system 104 may determine that the occupant is not driving vehicle 100 in accordance with safety best practices. As another example, if the occupant is looking at a display of vehicle computing system 104 for a prolonged period of time while vehicle 100 is in motion, vehicle computing system 104 may lock out or other prohibit the occupant from interacting with vehicle computing system 104.

In this way, techniques of this disclosure may enable a vehicle computing system to more accurately determine where an occupant of a vehicle is looking and, in instances where the occupant is the driver of the vehicle, more accurately determine driver engagement. Further, vehicle computing system 104 may use the more accurate determination of what the occupant is looking at to automatically take various safety-related actions or any number of other actions. Accordingly, techniques of this disclosure may enable improved vehicle safety systems.

Figure 2:
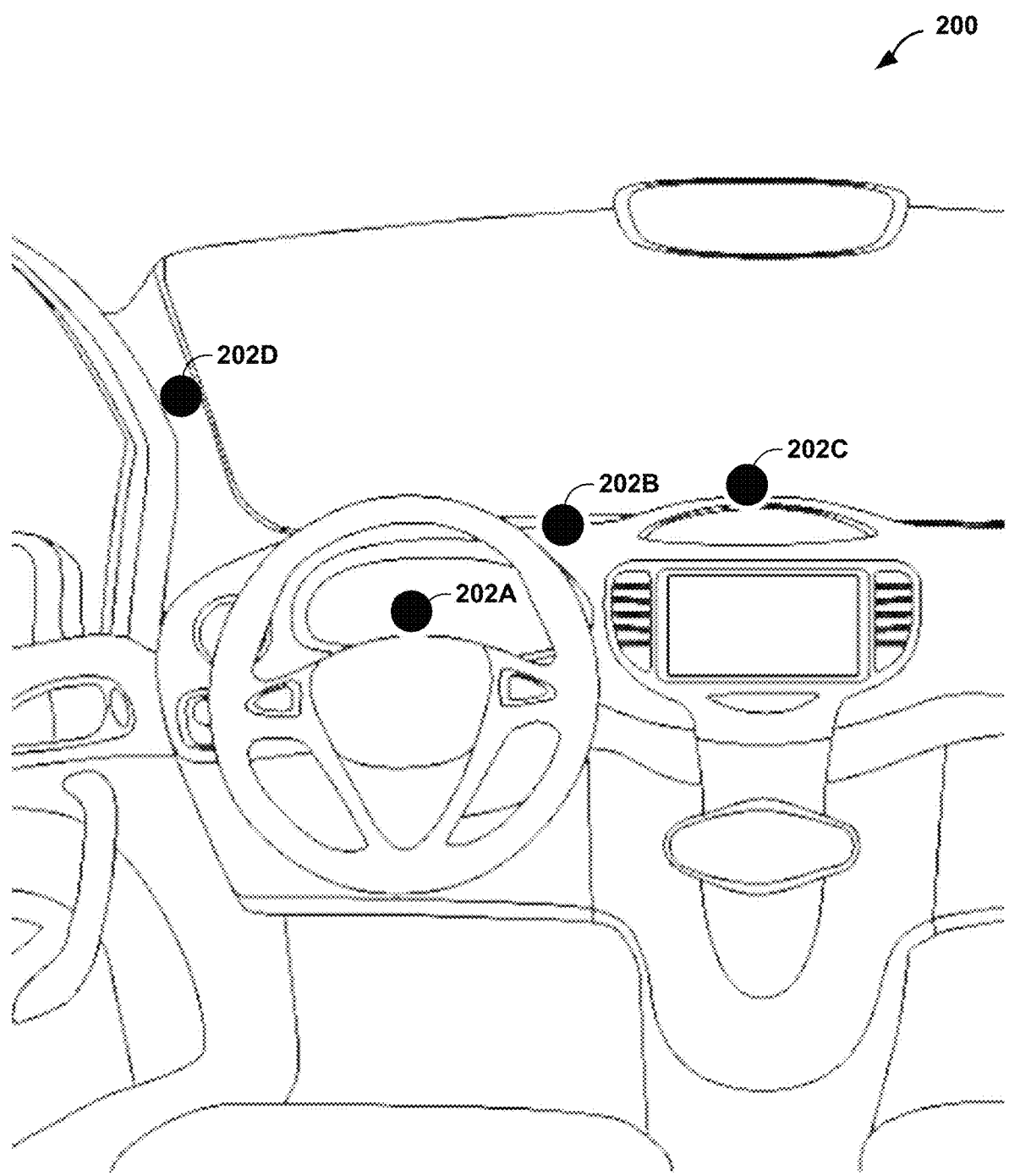
FIG. 2 is a conceptual diagram illustrating an example vehicle having an interior camera system, in accordance with one or more aspects of the present disclosure.

FIG. 2 is a conceptual diagram illustrating an example vehicle having an interior camera system, in accordance with one or more aspects of the present disclosure. Vehicle interior 200, as shown in FIG. 2, includes four cameras 202A-202D (collectively, "cameras 202") placed at various different locations of vehicle interior 200. Each of cameras 202 may be an example of cameras 102 shown and described with respect to FIG. 1.

Different camera placements within vehicle interior 200 may provide different advantages or disadvantages for capturing images of an occupant as described herein. For example, camera 202A is located within the instrument cluster of vehicle interior 200. As camera 202A is located directly in front of a likely head location of a driver of the vehicle, images captured by camera 202A may provide a high-quality image for determining the pitch, roll, and yaw of the facial plane of the driver. Whereas camera 202C, located above a vehicle head unit display, may capture images that include faces of both a driver and passenger of the vehicle. Such images may be used to determine an 3D eye gaze vector of a passenger of the vehicle and may also be used to differentiate between whether the driver or passenger of the vehicle is interacting with the vehicle head unit display. As another example, camera 202D, located within the A-pillar on the driver's side, may be an infrared camera that captures images used to determine a distance from camera 202D to the driver's eyes. Alternatively or in addition, vehicle computing system 104 may use images captured by both camera 202B and 202D to determine the parallax angle relative to the driver's eyes and, using the parallax angle, determine the distance from one or both of cameras 202B and 202D (or a central point between cameras 202B and 202D) to the driver's eyes. While vehicle interior 200 is of a left-hand drive vehicle, in other examples, vehicle interior 200 or vehicle 100 of FIG. 1 may be a right-hand drive vehicle. In such examples, placement of cameras 202 may be flipped (e.g., camera 202D may be on the right side A pillar).

Figure 3:
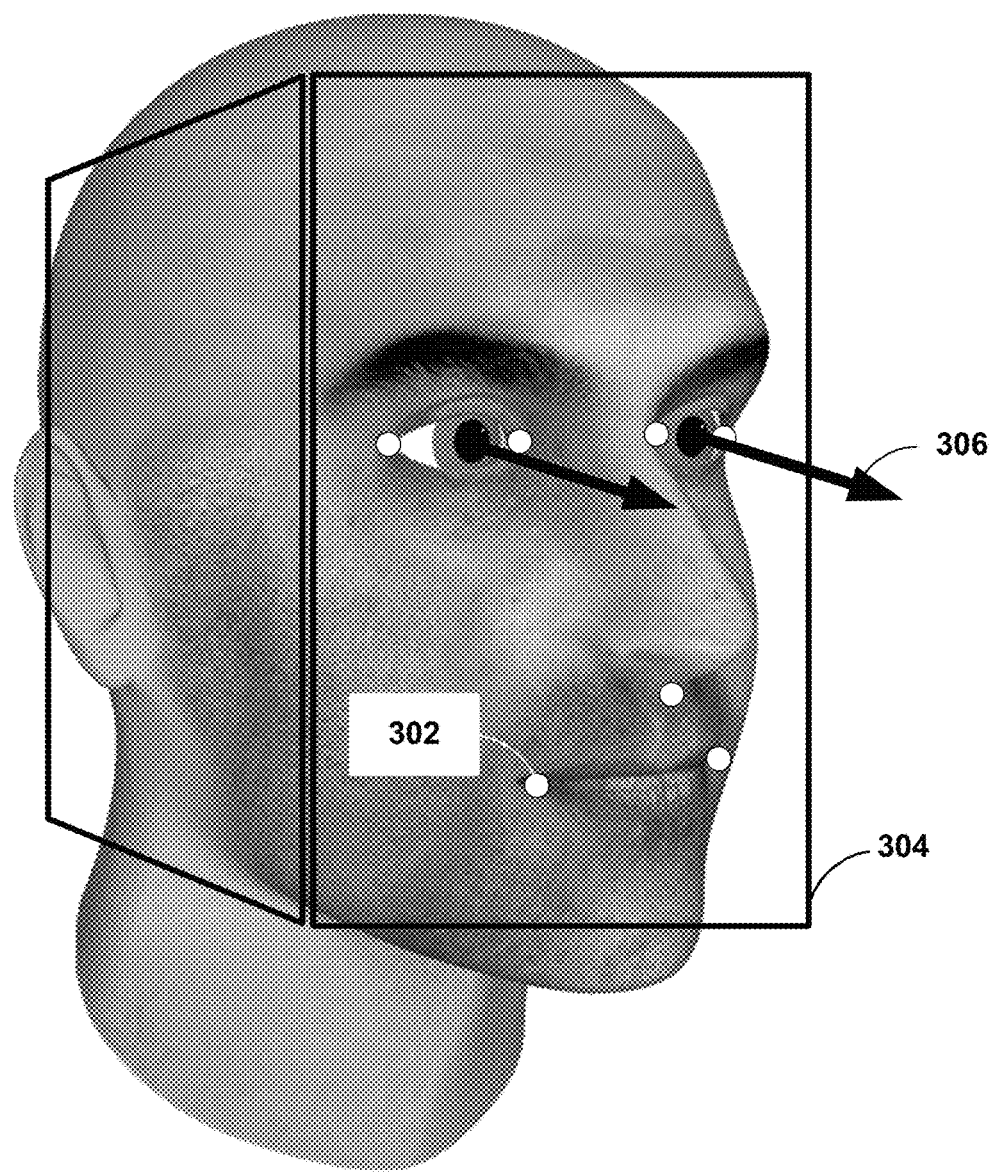
FIG. 3 is a conceptual diagram illustrating an example facial plane of a driver, in accordance with one or more aspects of the present disclosure.

FIG. 3 is a conceptual diagram illustrating an example facial plane of a driver, in accordance with one or more aspects of the present disclosure. As shown in FIG. 3, vehicle computing system 104 identified one or more facial landmarks 302 and facial plane 304, and determined 3D eye gaze vector 306.

Facial landmark 302 include two corners of the driver's mouth, the base of the driver's nose, and the corner of each of the driver's eyes. Vehicle computing system 104 may define the facial plane using these facial landmarks 302. For example, vehicle computing system 104 may determine the distances between one or more facial landmarks 302. In some instances, vehicle computing system 104 may determine the distance between the two corners of the driver's mouth and/or between corners of different eyes. By comparing these distances to reference or learned distances for the driver, vehicle computing system 104 may determine coordinates that define facial plane 304.

Using facial plane 304, vehicle computing system 104 may determine 3D eye gaze vector 306 (e.g., the second initial 3D eye gaze vector described with respect to FIG. 1). While shown as arrows coming out from both eyes of the driver, 3D eye gaze vector 306 may be a single vector that may be projected outward from the location of one or both of the driver's eyes. Further, 3D eye gaze vector 306 may be combined with another 3D eye gaze vector determined by vehicle computing system using eye tracking.

Figure 4:
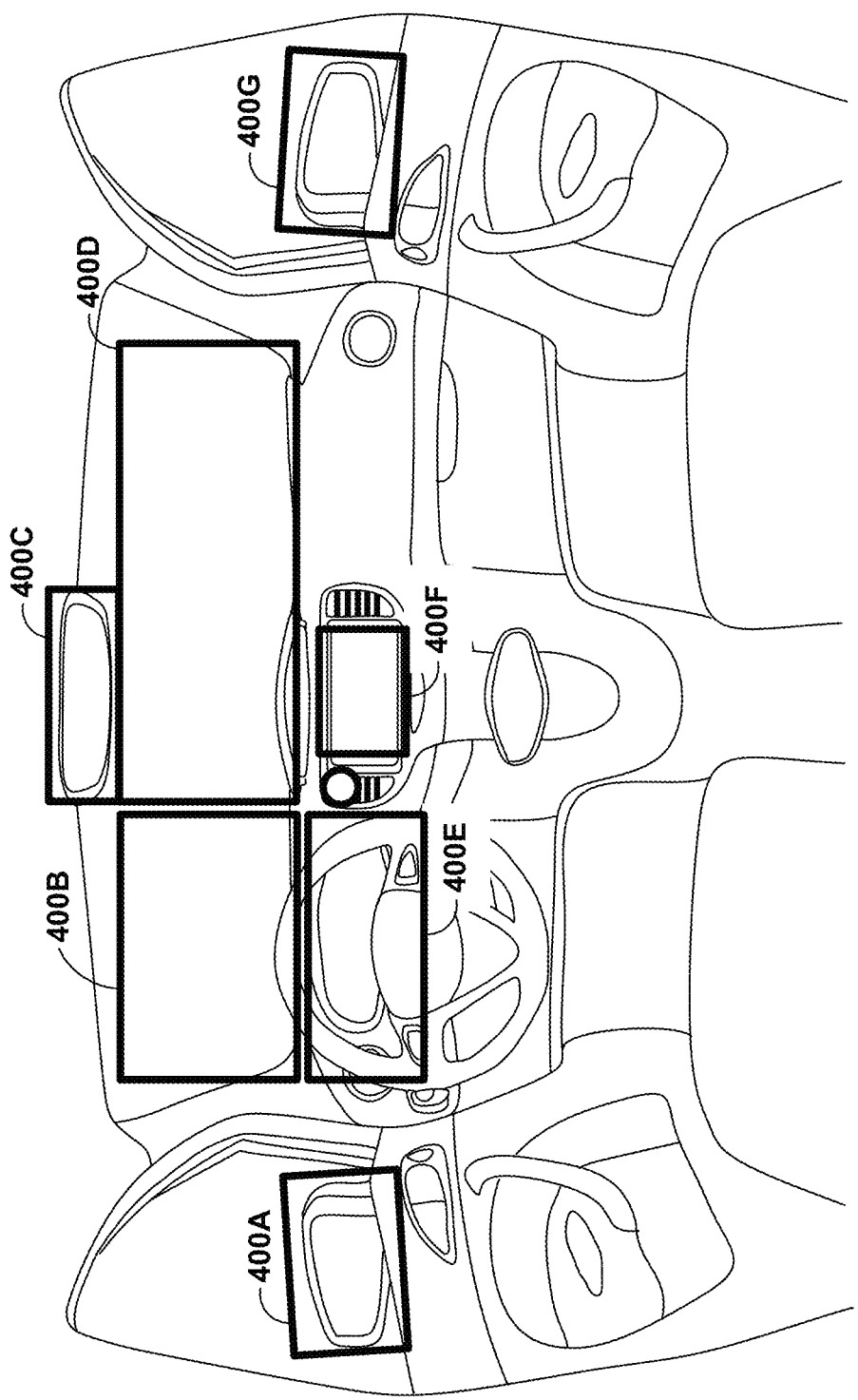
FIG. 4 is a conceptual diagram illustrating an example interior of a vehicle having regions of interest, in accordance with one or more aspects of the present disclosure.

FIG. 4 is a conceptual diagram illustrating an example interior of a vehicle having regions of interest, in accordance with one or more aspects of the present disclosure. As shown in FIG. 4, the interior of the vehicle includes regions of interest 400A-400G (collectively "regions of interest 400"). Regions of interest 400 may be defined in a vehicle data file for the particular make and model of the vehicle interior shown in FIG. 4. The vehicle data file specifies coordinates for each of regions of interest 400 that define a plane within the vehicle-based coordinate system. In general, the vehicle data file is defined using a structured data format, such as extensible markup language (XML). However, the information included in the vehicle data file may be encoded in any format that vehicle computing system 104 is configured to process.

Each of regions of interest 400 may be associated with a physical element of the vehicle. While described as being regions of interest of the interior of the vehicle, in various instances, the regions of interest may be associated with object located outside of the vehicle. For example, regions of interest 400A and 400G may each be associated with a side mirror of the vehicle (e.g., the driver-side and passenger-side side mirrors, respectively).

Other regions of interest may be associated with different areas of a single physical element of the vehicle. For example, regions of interest 400B and 400D may both be associated with the windshield of the vehicle. In this example, different portions of the windshield may be associated with different levels of driver engagement. Thus, if vehicle computing system 104 determines that the driver is looking at region of interest 400B, vehicle computing system 104 may determine that the user is likely looking at the road in front of the vehicle and is engaged with driving the vehicle. However, if vehicle computing system 104 determines that the driver is looking at region of interest 400D, vehicle computing system 104 may determine that the driver is looking at something off to the side of the road and, thus, may be less engaged with driving the vehicle than if the driver was looking at the road ahead of the vehicle. In instances where vehicle computing system 104 is determining whether the driver is following driving safety best practices, vehicle computing system 104 may determine that the vehicle is at a traffic light that just turned green. vehicle computing system 104 may determine if the driver checked for other vehicles that may have run a red light by, for example, determining if the driver looked at region of interest 400D.

In some examples, vehicle computing system 104 may use the region of interest at which the driver is looking to differentiate between actions being performed by the driver and actions being performed by a passenger. For example, if vehicle computing system 104 is receiving user input from a user interacting with the infotainment system (e.g., entering an address in a navigation application, selecting music, adjusting vehicle or passenger settings, etc.), vehicle computing system 104 may determine whether the driver is looking at region of interest 400F. If vehicle computing system 104 determines that the driver is not looking at region of interest 400F, vehicle computing system 104 may determine that a passenger is providing the inputs and allow the passenger to continue to use the infotainment system without restriction.

However, if the driver is looking at region of interest 400F, vehicle computing system 104 may determine that the driver is likely providing the user inputs. If the driver provides more than a threshold number of user inputs within a predetermined period of time or continues to interact with the infotainment system for greater than a predetermined period of time, vehicle computing system 104 may take various actions to encourage the driver to resume paying attention to the road. For example, vehicle computing system 104 may stop processing additional user inputs, may cease outputting a graphical user interface at the display, or may output a message reminding the driver to pay attention to the road, as non-limiting examples.

In some instances, vehicle computing system 104 may use the determined region of interest to determine where to output various notifications. For example, if vehicle computing system 104 determines that the driver is looking at region of interest 400E (i.e., corresponding to the instrument cluster), vehicle computing system 104 may output a warning message that the fuel in the vehicle is running low using the instrument cluster. If vehicle computing system 104 determined that the driver was looking at region of interest 400B rather than 400E, vehicle computing system 104 may output the warning message using a heads up display so that it is projected on the windshield of the vehicle within region of interest 400B.

Figure 5:
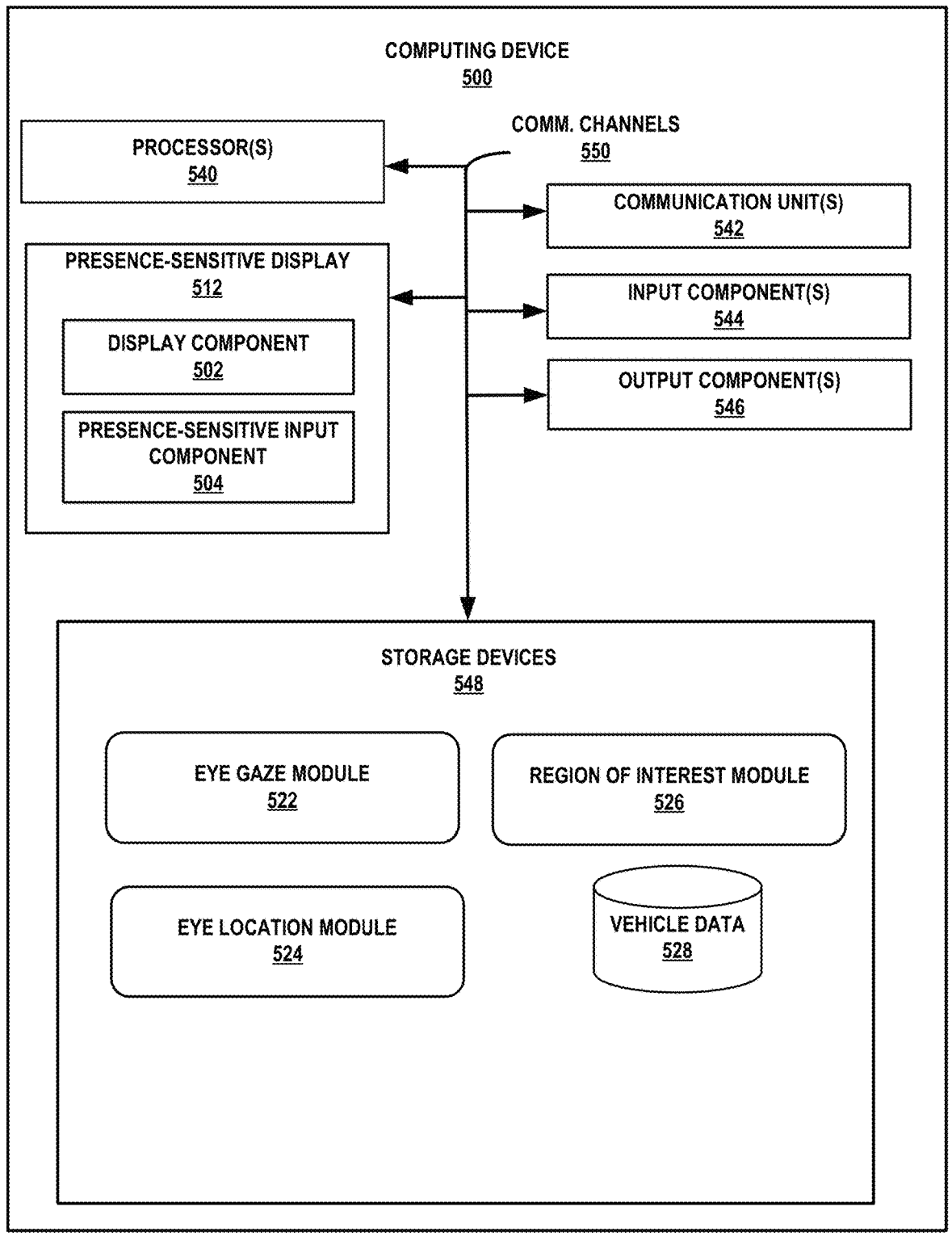
FIG. 5 is a block diagram illustrating an example computing device that is configured to determine driver engagement using three-dimensional eye gaze vectors, in accordance with one or more aspects of the present disclosure.

FIG. 5 is a block diagram illustrating an example computing device that is configured to determine driver engagement using 3D eye gaze vectors, in accordance with one or more aspects of the present disclosure. Computing device 500 is a more detailed example of vehicle computing system 104 of FIG. 1. FIG. 5 illustrates only one particular example of computing device 500, and many other examples of computing device 500 may be used in other instances and may include a subset of the components included in example computing device 500 or may include additional components not shown in FIG. 5.

As shown in the example of FIG. 5, computing device 500 includes presence-sensitive display 512, one or more processors 540, one or more communication units 542, one or more input components 544, one or more output components 546, and one or more storage devices 548. Storage devices 548 of computing device 500 include eye gaze module 522, eye location module 524, region of interest module 526, and vehicle data 528.

Communication channels 550 may interconnect each of the components 512, 540, 542, 546, and/or 548 for inter-component communications (physically, communicatively, and/or operatively). In some examples, communication channels 550 may include a system bus, a network connection, one or more inter-process communication data structures, or any other components for communicating data (also referred to as information).

One or more communication units 542 of computing device 500 may communicate with external devices by transmitting and/or receiving data. For example, computing device 500 may use one or more of communication units 542 to transmit and/or receive radio signals on a radio network such as a cellular radio network. In some examples, communication units 542 may transmit and/or receive satellite signals on a satellite network such as a Global Positioning System (GPS) network. Examples of communication units 542 include a network interface card (e.g. such as an Ethernet card), an optical transceiver, a radio frequency transceiver, a GPS receiver, or any other type of device that can send and/or receive information. Other examples of communication units 542 may include short wave radios (e.g., NFC, BLUETOOTH (including BLE)), GPS, 3G, 4G, 5G, and WIFI radios found in mobile devices as well as Universal Serial Bus (USB) controllers and the like.

One or more input components 544 of computing device 500 may receive input. Examples of input are tactile, audio, kinetic, and optical input, to name only a few examples. Input components 544 of computing device 500 include, in one example, a mouse, keyboard, touchpad, voice responsive system, video camera, buttons, scroll wheel, dial, control pad, microphone or any other type of device for detecting input from a human or machine. Input components 544 may include cameras, such as cameras 102 of FIG. 1. In some examples, input component 544 may be a presence-sensitive input component, which may include a presence-sensitive screen, touch-sensitive screen, etc.

One or more output components 546 of computing device 500 may generate output. Examples of output are tactile, audio, and video output. Output components 546 of computing device 500, in some examples, include a presence-sensitive screen, sound card, video graphics adapter card, speaker, cathode ray tube (CRT) monitor, liquid crystal display (LCD), organic light emitting diode (OLED), or any other type of device for generating tactile, audio and/or visual output to a human or machine.

In some examples, presence-sensitive display 512 of computing device 500 may include functionality of input component 544 and/or output components 546. In the example of FIG. 5, presence-sensitive display 512 may include a presence-sensitive input component 504, such as a presence-sensitive screen or touch-sensitive screen. In some examples, presence-sensitive input component 504 may detect an object at and/or near the presence-sensitive input component. As one example range, presence-sensitive input component 504 may detect an object, such as a finger or stylus that is within two inches or less of presence-sensitive input component 504. Presence-sensitive input component 504 may determine a location (e.g., an (x,y) coordinate) of the presence-sensitive input component at which the object was detected. In another example range, presence-sensitive input component 504 may detect an object two inches or less from presence-sensitive input component 504 and other ranges are also possible. Presence-sensitive input component 504 may determine the location of presence-sensitive input component 504 selected by a user's finger using capacitive, inductive, and/or optical recognition techniques.

In some examples, presence-sensitive display 512 may also provide output to a user using tactile, audio, or video stimuli as described with respect to output component 546. For instance, presence-sensitive display 512 may include display component 502 that displays a graphical user interface. Display component 502 may be any type of output component that provides visual output, such as described with respect to output components 546. While illustrated as an integrated component of computing device 500, presence-sensitive display 512 may, in some examples, be an external component that shares a data or information path with other components of computing device 500 for transmitting and/or receiving input and output. For instance, presence-sensitive display 512 may be a built-in component of computing device 500 located within and physically connected to the external packaging of computing device 500 (e.g., an in-vehicle screen mounted in a dashboard of a vehicle). In another example, presence-sensitive display 512 may be an external component of computing device 500 located outside and physically separated from the packaging of computing device 500 (e.g., a monitor, a projector, etc. that shares a wired and/or wireless data path with a electronic control unit of the vehicle). In some examples, presence-sensitive display 512, when located outside of and physically separated from the packaging of computing device 500, may be implemented by two separate components: a presence-sensitive input component 504 for receiving input and a display component 502 for providing output.

One or more storage components 548 within computing device 500 may store information for processing during operation of computing device 500 (e.g., computing device 500 may store data accessed by modules 522, 524, and 526 during execution at computing device 500). In some examples, storage component 548 is a temporary memory, meaning that a primary purpose of storage component 548 is not long-term storage. Storage components 548 on computing device 500 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 548, in some examples, also include one or more computer-readable storage media. Storage components 548 in some examples include one or more non-transitory computer-readable storage mediums. Storage components 548 may be configured to store larger amounts of information than typically stored by volatile memory. Storage components 548 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 548 may store program instructions and/or information (e.g., data) associated with modules 522, 524, and 526. Storage components 548 may include a memory configured to store data or other information associated with 522, 524, and 526, and vehicle data 528.

One or more processors 540 may implement functionality and/or execute instructions associated with computing device 500. Examples of processors 540 include application processors, display controllers, auxiliary processors, one or more sensor hubs, and any other hardware configure to function as a processor, a processing unit, or a processing device. Modules 522, 524, and 526 may be operable by processors 540 to perform various actions, operations, or functions of computing device 500. For example, processors 540 of computing device 500 may retrieve and execute instructions stored by storage components 548 that cause processors 540 to perform the operations described herein that are attributed to modules 522, 524, and 526. The instructions, when executed by processors 540, may cause computing device 500 to store information within storage components 548.

Eye location module 524 may determine a distance an occupant's head or eyes are from one or more cameras located in the vehicle and may determine a location of the occupant's head or eyes in 3D space relative the one or more cameras. Eye location module 524 may determine the distance and/or location of the occupant's head and/or eyes consistent with the techniques described with respect to FIG. 1. Further, similar to eye gaze module 522, all or some of the functionality of eye location module 524 may be performed by a camera system of the vehicle, by computing device 500, or a combination thereof.

Eye location module 524 may analyze parallax angles between images captured by two or more different cameras given that the location of each of the two or more cameras is known. Using the parallax angles and the distance between the cameras, eye location module 524 determines the distance between one or more of the two or more cameras and the occupant's eyes. As another example, eye location module 524 may analyze an image captured by a single infrared camera to determine the distortion of the image captured by the infrared camera to determine the distance between the infrared camera and the occupant's eyes.

Using this determined distance between the two or more cameras and the occupant's eyes as well as the location of the occupant's eyes in the captured images, eye location module 524 may place the occupant's eyes in 3D space relative to the two or more cameras. That is, eye location module 524 may determine a location of the occupant's eyes within the interior of a vehicle relative to a location of at least one camera. The location of the occupant's eyes is a location within a 3D space defined relative to the at least one camera. For example, the 3D space may be spherical and have a centroid that corresponds to a location of a camera. The location of the occupant's eyes, in such examples, may be defined in terms of (x,y,z) coordinates where (0,0,0) is the location of the camera that is being used as the centroid of the sphere. Such a coordinate may be referred to as being located within a "camera-based coordinate system."

Eye gaze module 522 may determine the 3D eye gaze vector of an occupant of a vehicle consistent with the techniques described with respect to FIGS. 1 and 3. While shown as being a component of computing device 500, in various examples, the functionality of eye gaze module 522 may be performed by a camera system of the vehicle instead of or in additional to being performed by computing device 500. Further, the camera system and eye gaze module 522 may perform discrete portions of the 3D eye gaze vector determination process.

In various instances, eye gaze module 522 may perform eye tracking to determine a first initial 3D eye gaze vector and may determine a facial plane of the occupant to determine a second initial 3D eye gaze vector. Eye gaze module 522 may combine the first and second initial 3D eye gaze vectors to determine a final 3D eye gaze vector for the occupant. Using the eye position and movement of a pupil or other features of the eye (i.e. eye tracking), eye gaze module 522 may determine a first initial 3D eye gaze vector. However, in various instances, the occupant's eyes may be occluded and, thus, the images captured by the cameras may not include a clear image of the occupant's eyes. Thus, rather than just relying upon tracking the position and movement of the occupant's eyes, eye gaze module 522 may further analyze the captured images to determine a facial plane of the occupant.

In calculating the facial plane of the occupant, eye gaze module 522 may identify a plurality of facial landmarks in one or more images captured by one or more of cameras 102. Facial landmarks may include edges of a mouth, eyes, nose, ears, eyebrows, jaw, or other facial features. Using the identified facial landmarks, eye gaze module 522 may determine if the occupant's face included in image exhibits any pitch, roll, or yaw based on a geometric consistency between the various facial landmarks. For example, if the distances between the occupant's two eyes relative to the overall distance between the occupant's mouth and eyes is smaller than when the occupant is looking straight ahead, eye gaze module 522 determines that the occupant is looking to the left or right. If eye gaze module 522 determined that the image includes a right ear of the occupant but not a left ear of the occupant, eye gaze module 522 determines that the occupant is looking to the left. The pitch, roll, and yaw angles of the facial plane may be determined based on the relative change in distances between facial landmarks. Using the pitch, roll, and yaw angles of the determined facial plane, eye gaze module 522 may determine a second initial 3D eye gaze vector.

In various instances, eye gaze module 522 may apply a trained machine learning model to the image to determine the facial plane. The machine learning model may be trained using images of other people having the facial landmarks already identified and the facial plane angle already determined. The machine learning model may continually learn based on user feedback and feedback provided by eye gaze module 522. For example, eye gaze module 522 may rank or adjust the parameters of the machine learning model based on the first initial 3D eye gaze vector determined using eye tracking as compared to the second 3D eye gaze vector determined using the facial plane.

Once the first and second initial 3D eye gaze vectors are determined, eye gaze module 522 may determine, based on both the first and second initial 3D eye gaze vectors, a 3D eye gaze vector of the occupant. In various instances, eye gaze module 522 may determine the 3D eye gaze vector using an average of the first and second initial 3D eye gaze vectors. Eye gaze module 522 may, in other examples, apply a weighting to one or more of the first and second 3D eye gaze vectors and use the weighted values to the determine 3D eye gaze vector. Eye gaze module 522 may determine weights to apply to the first and second initial 3D eye gaze vectors based on a confidence that the first or second initial 3D eye gaze vector was accurately determined. For example, if eye gaze module 522 detected only a portion of the facial landmarks (e.g., just the eyes and nose, but no mouth or jaw), there may be an increased error range for the pitch, roll, and yaw angles of the facial plane. As such, eye gaze module 522 may apply a reduced weighting value to the second initial 3D eye gaze vector and an increased weighting value to the first initial 3D eye gaze vector determined using eye tracking.

While described as requiring both the first and second initial 3D eye gaze vectors, eye gaze module 522 may also determine a 3D eye gaze vector using one of the first and second initial 3D eye gaze vectors. For example, if the occupant's eyes are closed in the images captured by the two or more cameras or the occupant is wearing sunglasses, eye gaze module 522 may use the second initial 3D eye gaze vector (i.e., the 3D eye gaze vector determined based on the pitch, roll, and yaw of the facial plane of the occupant) as the determined 3D eye gaze vector. As another example, if the images captured by the two or more cameras include the occupant's face partially obscured (e.g., by the occupant's hand), eye gaze module 522 may use the first initial 3D eye gaze vector (i.e., the 3D eye gaze vector determined using eye tracking) as the determined 3D eye gaze vector.

Region of interest module 526 may determine which region of interest at which an occupant of the vehicle is looking, consistent with the techniques described with respect to FIGS. 1 and 4. Region of interest module 526 may load vehicle specific data from vehicle data 528. Vehicle data 528 may be any type of data store, such as a file, a database, or other data structure suitable for storing textual or encoded information usable by region of interest module to determine at which region of interest the occupant is looking. Vehicle data includes coordinates that define two-dimensional planes associate with various regions of interest of the vehicle. In some instances, each plane may be associated with a different physical element of the vehicle (e.g., a rearview mirror, a head unit display, an instrument panel, etc.) or different portions of the same physical element of the vehicle (e.g., different areas of the windshield).

Region of interest module may receive the 3D eye gaze vector information from eye gaze module 522 and may also receive occupant head and/or eye location information from eye location module 524. Region of interest module 526 may transform the head and/or eye location information from the camera-based coordinate system to the vehicle-based coordinate system. By transforming the coordinates to the vehicle-based coordinate system, region of interest module 526 may locate the head and/or eyes of the occupant relative to the coordinate locations of various physical objects of the vehicle as specified in the vehicle data. Region of interest module 526 may project the 3D eye gaze vector from the vehicle-based coordinate system location of the occupant's head and/or eyes and determine one or more planes intersected by the 3D eye gaze vector. Region of interest module 526 identifies the intersected planes as the regions of interest at which the occupant is looking.

In some instances, region of interest module 526 may periodically or continually determine at which region of interest the occupant of the vehicle is looking over time. By monitoring which regions of interest the occupant is looking at, region of interest module 526 may determine a level of engagement of the occupant and may determine how well the occupant is following the rules of the road and safe driving best practices. For example, if the occupant changes lanes without looking at a sideview mirror or reverses vehicle without looking out the rear window, computing device 500 may determine that the occupant is not driving the vehicle in accordance with safety best practices. As another example, if the occupant is looking at a display of computing device 500 for a prolonged period of time while the vehicle is in motion, computing device 500 may lock out or other prohibit the occupant from interacting with computing device 500.

One or more of the techniques performed by eye gaze module 522, eye location module 524, and region of interest module 526 may be performed using machine learning. While not shown in FIG. 5, computing device 500 may include one or more trained machine learning modules that are applied to the images captures by the cameras.

FIGS. 6A through 6E are conceptual diagrams illustrating aspects of an example machine-learned model according to example implementations of the present disclosure. FIGS. 6A through 6E are described below in the context of vehicle 100 of FIG. 1. For example, in some instances, machine-learned model 600, as referenced below, may be an example of any of model used by the camera system or vehicle computing system 104 to determine the 3D eye gaze vector, the location of the occupant's head and/or eyes, the regions of interest at which the occupant is looking, or components thereof.

Figure 6A:
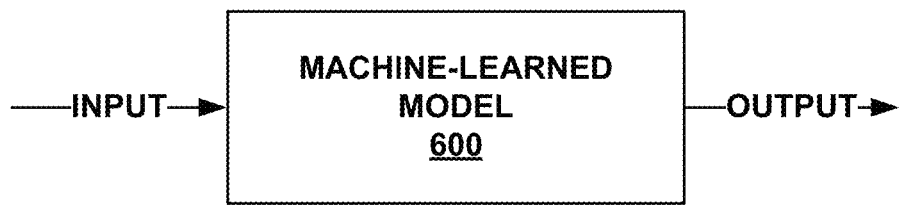
FIGS. 6A through 6E are conceptual diagrams illustrating aspects of an example machine-learned model, in accordance with one or more aspects of the present disclosure.

FIG. 6A depicts a conceptual diagram of an example machine-learned model according to example implementations of the present disclosure. As illustrated in FIG. 6A, in some implementations, machine-learned model 600 is trained to receive input data of one or more types and, in response, provide output data of one or more types. Thus, FIG. 6A illustrates machine-learned model 600 performing inference.

The input data may include one or more features that are associated with an instance or an example. In some implementations, the one or more features associated with the instance or example can be organized into a feature vector. In some implementations, the output data can include one or more predictions. Predictions can also be referred to as inferences. Thus, given features associated with a particular instance, machine-learned model 600 can output a prediction for such instance based on the features.

Machine-learned model 600 can be or include one or more of various different types of machine-learned models. In particular, in some implementations, machine-learned model 600 can perform classification, regression, clustering, anomaly detection, recommendation generation, facial landmark detection, 3D eye gaze determination, and/or other tasks.

In some implementations, machine-learned model 600 can perform various types of classification based on the input data. For example, machine-learned model 600 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 600 may perform discrete categorical classification in which the input data is simply classified into one or more classes or categories.

In some implementations, machine-learned model 600 can perform classification in which machine-learned model 600 provides, for each of one or more classes, a numerical value descriptive of a degree to which it is believed that the input data should be classified into the corresponding class. In some instances, the numerical values provided by machine-learned model 600 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine-learned model 600 may output a probabilistic classification. For example, machine-learned model 600 may predict, given a sample input, a probability distribution over a set of classes. Thus, rather than outputting only the most likely class to which the sample input should belong, machine-learned model 600 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine-learned model 600 performs classification, machine-learned model 600 may be trained using supervised learning techniques. For example, machine-learned model 600 may be trained on a training dataset that includes training examples labeled as belonging (or not belonging) to one or more classes. Further details regarding supervised training techniques are provided below in the descriptions of FIGS. 6B through 6E.

In some implementations, machine-learned model 600 can perform regression to provide output data in the form of a continuous numeric value. The continuous numeric value can correspond to any number of different metrics or numeric representations, including, for example, currency values, scores, or other numeric representations. As examples, machine-learned model 600 can perform linear regression, polynomial regression, or nonlinear regression. As examples, machine-learned model 600 can perform simple regression or multiple regression. As described above, in some implementations, a Softmax function or other function or layer can be used to squash a set of real values respectively associated with a two or more possible classes to a set of real values in the range (0, 1) that sum to one.

Machine-learned model 600 may perform various types of clustering. For example, machine-learned model 600 can identify one or more previously-defined clusters to which the input data most likely corresponds. Machine-learned model 600 may identify one or more clusters within the input data. That is, in instances in which the input data includes multiple objects, documents, or other entities, machine-learned model 600 can sort the multiple entities included in the input data into a number of clusters. In some implementations in which machine-learned model 600 performs clustering, machine-learned model 600 can be trained using unsupervised learning techniques.

Machine-learned model 600 may perform anomaly detection or outlier detection. For example, machine-learned model 600 can identify input data that does not conform to an expected pattern or other characteristic (e.g., as previously observed from previous input data). As examples, the anomaly detection can be used for fraud detection or system failure detection.

In some implementations, machine-learned model 600 can provide output data in the form of one or more object locations. For example, machine-learned model 600 can be included in an 3D eye gaze vector determination system. As an example, given input data that describes previous outcomes for certain facial landmarks (e.g., a score, ranking, or rating indicative of locations of facial landmarks), machine-learned model 600 can output locations of facial landmarks in a new image. As one example, given input data descriptive of an occupant of a vehicle, such as one or more images of an occupant of vehicle 100 of FIG. 1, a computing system, such as vehicle computing system 104 of FIG. 1, can output locations of facial landmarks of the occupant.

Machine-learned model 600 may, in some cases, act as an agent within an environment. For example, machine-learned model 600 can be trained using reinforcement learning, which will be discussed in further detail below.

In some implementations, machine-learned model 600 can be a parametric model while, in other implementations, machine-learned model 600 can be a non-parametric model. In some implementations, machine-learned model 600 can be a linear model while, in other implementations, machine-learned model 600 can be a non-linear model.

As described above, machine-learned model 600 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 600 can be or include one or more classifier models such as, for example, linear classification models; quadratic classification models; etc. Machine-learned model 600 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 600 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 600 may be or include one or more kernel machines. In some implementations, machine-learned model 600 can be or include one or more support vector machines. Machine-learned model 600 may be or include one or more instance-based learning models such as, for example, learning vector quantization models; self-organizing map models; locally weighted learning models; etc. In some implementations, machine-learned model 600 can be or include one or more nearest neighbor models such as, for example, k-nearest neighbor classifications models; k-nearest neighbors regression models; etc. Machine-learned model 600 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 600 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine-learned model 600 can be or include one or more feed forward neural networks. In feed forward networks, the connections between nodes do not form a cycle. For example, each connection can connect a node from an earlier layer to a node from a later layer.

In some instances, machine-learned model 600 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect a change in the region of interest at which the occupant is looking, as one non-limiting example.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 600 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 600 can be or include one or more generative networks such as, for example, generative adversarial networks. Generative networks can be used to generate new data such as new images or other content.

Machine-learned model 600 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 600 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 600 may include one or more clustering models such as, for example, k-means clustering models; k-medians clustering models; expectation maximization models; hierarchical clustering models; etc.

In some implementations, machine-learned model 600 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 600 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 600 can be an autoregressive model. In some instances, an autoregressive model can specify that the output data depends linearly on its own previous values and on a stochastic term. In some instances, an autoregressive model can take the form of a stochastic difference equation. One example autoregressive model is WaveNet, which is a generative model for raw audio.

In some implementations, machine-learned model 600 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 600 can be used to preprocess the input data for subsequent input into another model. For example, machine-learned model 600 can perform dimensionality reduction techniques and embeddings (e.g., matrix factorization, principal components analysis, singular value decomposition, word2vec/ GLOVE, and/or related approaches); clustering; and even classification and regression for downstream consumption. Many of these techniques have been discussed above and will be further discussed below.

As discussed above, machine-learned model 600 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 600 can receive and use the input data in its raw form. In some implementations, the raw input data can be preprocessed. Thus, in addition or alternatively to the raw input data, machine-learned model 600 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 600. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 300 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to determine facial planes, 3D eye gaze vectors, location of an occupants head and/or eyes, and regions of interest at which the occupant is looking. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 6B:
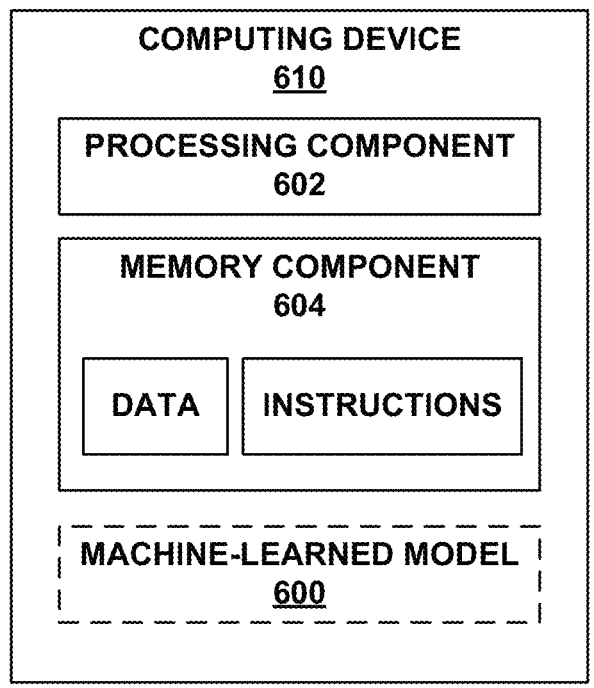

FIG. 6B illustrates a conceptual diagram of computing device 610, which is an example of vehicle computing system 104 of FIG. 1 and/or computing device 500 of FIG. 5. Computing device 610 includes processing component 602, memory component 604 and machine-learned model 600. Computing device 610 may store and implement machine-learned model 600 locally (i.e., on-device). Thus, in some implementations, machine-learned model 600 can be stored at and/or implemented locally by an embedded device or a user computing device such as a mobile device. Output data obtained through local implementation of machine-learned model 600 at the embedded device or the user computing device can be used to improve performance of the embedded device or the user computing device (e.g., an application implemented by the embedded device or the user computing device).

Figure 6C:
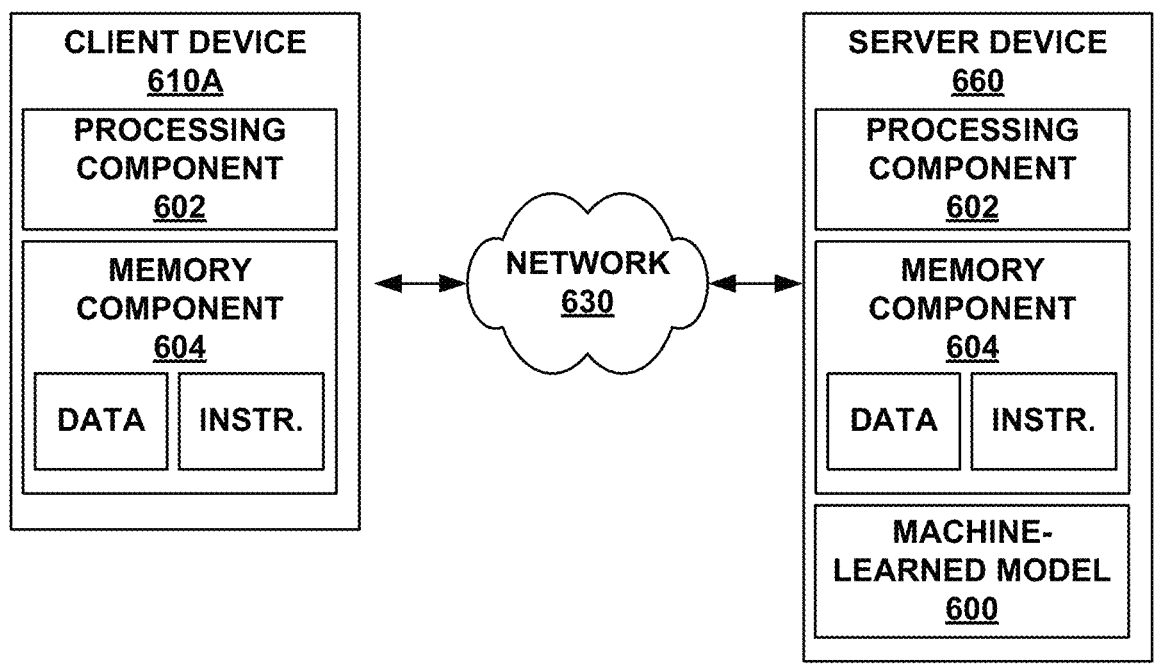

FIG. 6C illustrates a conceptual diagram of an example client computing device that can communicate over a network with an example server computing system that includes a machine-learned model. FIG. 6C includes client device 610A communicating with server device 660 over network 630. Client device 610A is an example of vehicle computing system 104 of FIG. 1 and/or an example of computing device 500 of FIG. 5. Server device 660 stores and implements machine-learned model 600. In some instances, output data obtained through machine-learned model 600 at server device 660 can be used to improve other server tasks or can be used by other non-user devices to improve services performed by or for such other non-user devices. For example, the output data can improve other downstream processes performed by server device 660 for a computing device of a user or embedded computing device. In other instances, output data obtained through implementation of machine-learned model 600 at server device 660 can be sent to and used by a user computing device, an embedded computing device, or some other client device, such as client device 610A. For example, server device 660 can be said to perform machine learning as a service.

In yet other implementations, different respective portions of machine-learned model 600 can be stored at and/or implemented by some combination of a user computing device; an embedded computing device; a server computing device; etc. In other words, portions of machine-learned model 600 may be distributed in whole or in part amongst client device 610A and server device 660.

Devices 610A and 660 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 610A and 660 may be distributed at different physical locations and connected via one or more networks, including network 630. If configured as distributed computing devices, Devices 610A and 660 may operate according to sequential computing architectures, parallel computing architectures, or combinations thereof. In one example, distributed computing devices can be controlled or guided through use of a parameter server.

In some implementations, multiple instances of machine-learned model 600 can be parallelized to provide increased processing throughput. For example, the multiple instances of machine-learned model 600 can be parallelized on a single processing device or computing device or parallelized across multiple processing devices or computing devices.

Each computing device that implements machine-learned model 600 or other aspects of the present disclosure can include a number of hardware components that enable performance of the techniques described herein. For example, each computing device can include one or more memory devices that store some or all of machine-learned model 600. For example, machine-learned model 600 can be a structured numerical representation that is stored in memory. The one or more memory devices can also include instructions for implementing machine-learned model 600 or performing other operations. Example memory devices include RAM, ROM, EEPROM, EPROM, flash memory devices, magnetic disks, etc., and combinations thereof.

Each computing device can also include one or more processing devices that implement some or all of machine-learned model 600 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 6D:
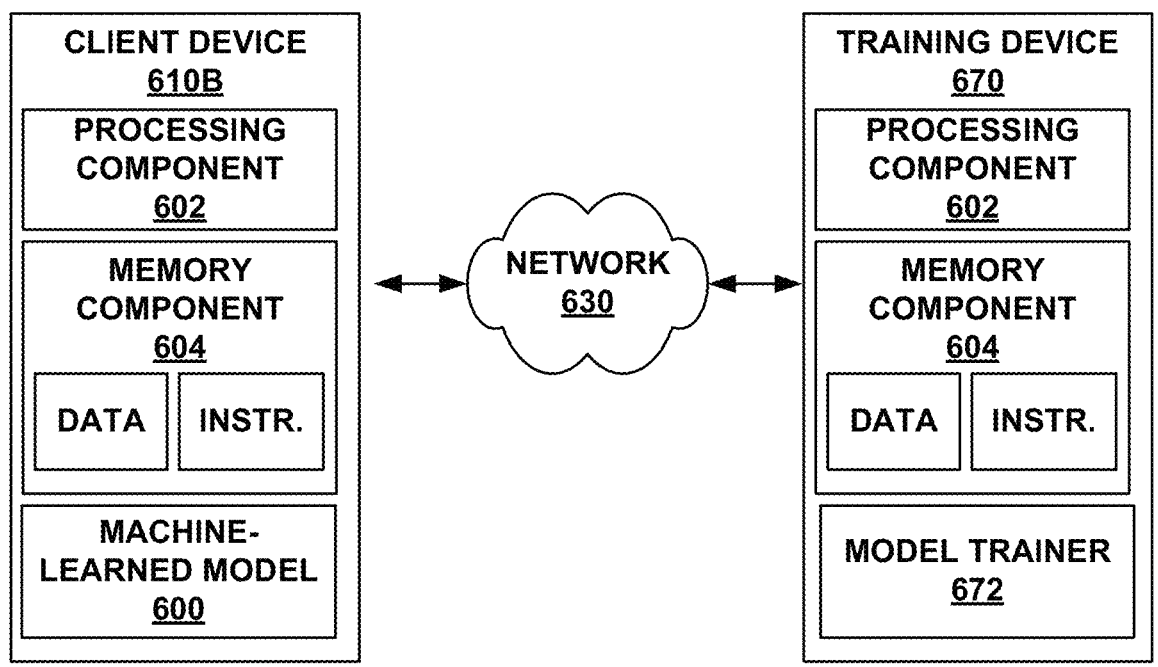

FIG. 6D illustrates a conceptual diagram of an example computing device in communication with an example training computing system that includes a model trainer. FIG. 6D includes client device 610B communicating with training device 670 over network 630. Client device 610B is an example of vehicle computing system 104 of FIG. 1 and/or computing device 500 of FIG. 5. Machine-learned model 600 described herein can be trained at a training computing system, such as training device 670, and then provided for storage and/or implementation at one or more computing devices, such as client device 610B. For example, model trainer 672 executes locally at training device 670. However, in some examples, training device 670, including model trainer 672, can be included in or separate from client device 610B or any other computing device that implement machine-learned model 600.

In some implementations, machine-learned model 600 may be trained in an offline fashion or an online fashion. In offline training (also known as batch learning), machine-learned model 600 is trained on the entirety of a static set of training data. In online learning, machine-learned model 600 is continuously trained (or re-trained) as new training data becomes available (e.g., while the model is used to perform inference).

Model trainer 672 may perform centralized training of machine-learned model 600 (e.g., based on a centrally stored dataset). In other implementations, decentralized training techniques such as distributed training, federated learning, or the like can be used to train, update, or personalize machine-learned model 600.

Machine-learned model 600 described herein can be trained according to one or more of various different training types or techniques. For example, in some implementations, machine-learned model 600 can be trained by model trainer 672 using supervised learning, in which machine-learned model 600 is trained on a training dataset that includes instances or examples that have labels. The labels can be manually applied by experts, generated through crowdsourcing, or provided by other techniques (e.g., by physics-based or complex mathematical models). In some implementations, if the user has provided consent, the training examples can be provided by the user computing device. In some implementations, this process can be referred to as personalizing the model.

Figure 6E:
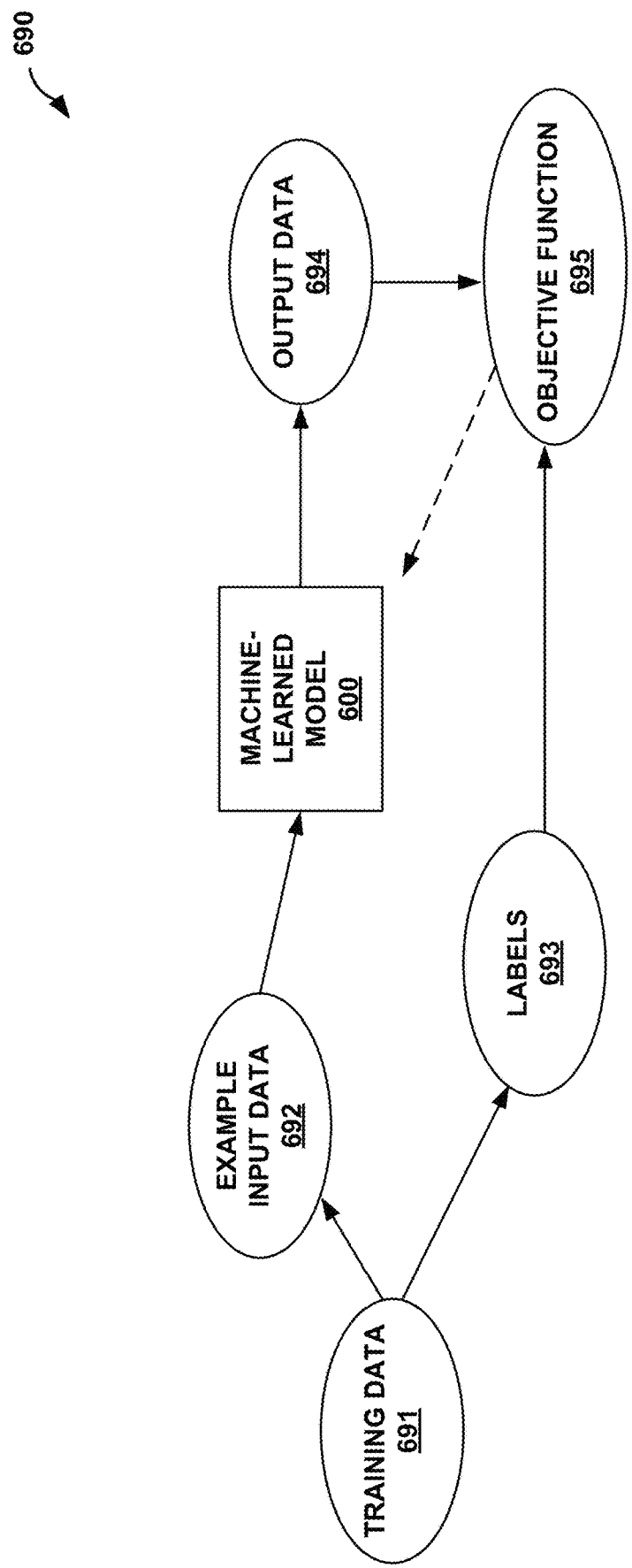

FIG. 6E illustrates a conceptual diagram of training process 690 which is an example training process in which machine-learned model 600 is trained on training data 691 that includes example input data 692 that has labels 693. Training processes 690 is one example training process; other training processes may be used as well.

Training data 691 used by training process 690 can include, upon user permission for use of such data for training, anonymized usage logs of sharing flows, e.g., content items that were shared together, bundled content pieces already identified as belonging together, e.g., from entities in a knowledge graph, etc. In some implementations, training data 691 can include examples of input data 692 that have been assigned labels 693 that correspond to output data 694.

In some implementations, machine-learned model 600 can be trained by optimizing an objective function, such as objective function 695. For example, in some implementations, objective function 695 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 695 may be or include a cost function that describes a cost of a certain outcome or output data. Other examples of objective function 695 can include margin-based techniques such as, for example, triplet loss or maximum-margin training.

One or more of various optimization techniques can be performed to optimize objective function 695. For example, the optimization technique(s) can minimize or maximize objective function 695. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 300 (e.g., when machine-learned model is a multi-layer model such as an artificial neural network). For example, an iterative cycle of propagation and model parameter (e.g., weights) update can be performed to train machine-learned model 600. Example backpropagation techniques include truncated backpropagation through time, Levenberg-Marquardt backpropagation, etc.

In some implementations, machine-learned model 600 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 600 can be trained using semi-supervised techniques which combine aspects of supervised learning and unsupervised learning. Machine-learned model 600 can be trained or otherwise generated through evolutionary techniques or genetic algorithms. In some implementations, machine-learned model 600 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

In some implementations, one or more generalization techniques can be performed during training to improve the generalization of machine-learned model 600. Generalization techniques can help reduce overfitting of machine-learned model 600 to the training data. Example generalization techniques include dropout techniques; weight decay techniques; batch normalization; early stopping; subset selection; stepwise selection; etc.

In some implementations, machine-learned model 600 described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 600 described herein.

In some implementations, machine-learned model 600 described herein can be included in different portions of computer-readable code on a computing device. In one example, machine-learned model 600 can be included in a particular application or program and used (e.g., exclusively) by such particular application or program. Thus, in one example, a computing device can include a number of applications and one or more of such applications can contain its own respective machine learning library and machine-learned model(s).

In another example, machine-learned model 600 described herein can be included in an operating system of a computing device (e.g., in a central intelligence layer of an operating system) and can be called or otherwise used by one or more applications that interact with the operating system. In some implementations, each application can communicate with the central intelligence layer (and model (s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 7:
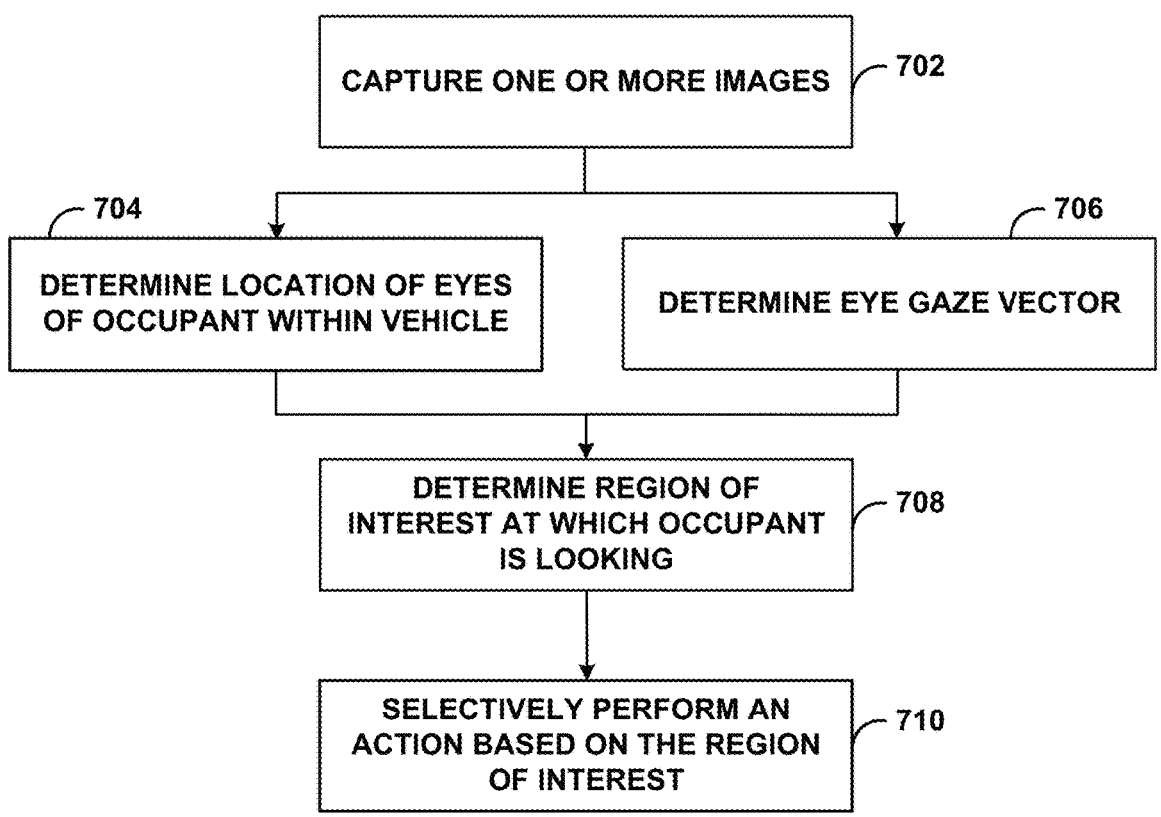
FIG. 7 is a flowchart illustrating example operations of a computing system that is configured to determine driver engagement using three-dimensional eye gaze vectors, in accordance with one or more aspects of the present disclosure.

FIG. 7 is a flowchart illustrating example operations of a computing system that is configured to determine driver engagement using 3D eye gaze vectors, in accordance with one or more aspects of the present disclosure. The operations of FIG. 7 are described below in the context of vehicle 100 of FIG. 1 and example computing device 500 of FIG. 5. One or more cameras 102 may capture at least one image of an occupant of vehicle 100 (702).

Eye location module 524 of computing device 500 may analyze the at least one image and determine a location of the head and/or eye of the occupant within vehicle 100 (704). For example, the at least one image may include two images each taken by a different one of cameras 102. Eye location module 524 may determine the parallax angle of the cameras 102 relative to the head of the occupant captured in the images. Using the parallax angle and a distance between the cameras 102, eye location module 524 may determine a distance that the occupant's head and/or eyes are from one or more of cameras 102. Using the distance the occupant's head and/or eye are form the one or more of cameras 102 and relative locations of each of the one or more of cameras 102 in 3D space, eye location module 524 can determine a location of the occupant's head and/or eyes in 3D space relative to the one or more of cameras 102. As another example, one of cameras 102 may be an infrared camera that captures an infrared image of the occupant. Eye location module 524 may analyze distortion in the infrared image and determine the distance the occupant's head and/or eyes are from the camera based on the distortion. Eye location module 524 may also determine the location of the occupant's head and/or eyes relative to the camera based on the location of the head and/or eyes within the image.

Eye gaze module 522 may determine an 3D eye gaze vector of the occupant of the vehicle (706). In some instances, eye gaze module 522 may analyze one or more images captured by one or more of cameras 102 an determine a facial plane of the occupant. For example, eye gaze module 522 may apply a machine-learned module to the one or more images to identify various facial landmarks of the occupant within the images and may also apply a machine-learned model to the locations of the identified facial landmarks to determine a pitch, roll, and yaw of the facial plane of the occupant. In some instances, a single machine-learned module may both identify the facial landmarks and determine the pitch, roll, and yaw angles of the facial plane. As another example, eye gaze module 522 may perform heuristics to determine the locations of the facial landmarks and may calculate the pitch, roll, and yaw angles of the facial plane using techniques other than machine learning. Using the yaw, pitch, and roll angles of the facial plane, eye gaze module 522 may determine an 3D eye gaze vector for the occupant.

In some instances, eye gaze module 522 may also determine an 3D eye gaze vector using eye tracking. However, an occupant's eyes may be occluded and, thus, not appear in an image. In such instance, rather than using eye tracking to determine the 3D eye gaze vector, eye gaze module 522 may use the facial plane to determine the 3D eye gaze vector. Instances where eye gaze module 522 can determine an initial 3D eye gaze vector both based on eye tracking on based on the facial plane, eye gaze module 522 may determine a final 3D eye gaze vector using a combination of both the initial 3D eye gaze vectors.

Region of interest module 526 may use both the 3D eye gaze vector determined by eye gaze module 522 and the head and/or eye location determined by eye location module 524 to determine one or more regions of interests at which the occupant is looking (708). In various instances, the head and/or eye location determined by eye location module 524 is a set of coordinates defined relative to a location of one or more cameras 102. That is, the location of the head and/or eye may be specified using a camera-based coordinate system. In such instances, region of interest module 526 may transform the location data from a camera-based coordinate system to a vehicle-based coordinate system. The vehicle-base coordinate system may be defined by a vehicle data file provided to vehicle computing system 104. The vehicle data file may include coordinates that define a plurality of regions of interest of the vehicle using the vehicle-based coordinate system.

Region of interest module 526 may project the 3D eye gaze vector determined by eye gaze module 522 from a vehicle-based coordinate location of one or more of the occupant's eyes. Region of interest module 526 may determine which, if any, of the planes of the regions of interest the 3D eye gaze vector intersects and a particular location within each plane at which the 3D eye gaze vector intersects. Because the coordinate locations of the occupant's eyes and the regions of interest are specified using the same coordinate system, region of interest module 526 can determine the distance between each of the regions of interest and the location of the occupant's eyes. Using this distance along with the 3D eye gaze vector direction, region of interest module 526 can determine the location at which the 3D eye gaze vector intersects with one or more of the planes for the regions of interest. Region of interest module 526 determines that the planes for the regions of interest that are intersected by the 3D eye gaze vector are the one or more regions of interested at which the occupant is looking.

In various instances, once region of interest module 526 determines the at least one region of interest at which the occupant is looking, vehicle computing system 104 may take one or more actions (710). For example, if an occupant of vehicle 100 is looking out a side window for at least a threshold duration of time, vehicle computing system 104 may determine that the occupant is looking at something located outside of the side window, such as scenery. Vehicle computing system 104 may automatically control a camera located on the exterior of vehicle 100 and cause the camera to capture an image of the scenery without requiring the occupant to pick up a camera and take a picture themselves.

As another example, if the occupant of vehicle 100 is the driver of vehicle 100, vehicle computing system 104 may determine that the driver is looking at a display of vehicle computing system 104 rather than watching the road. In such instances, vehicle computing system 104 may be configured to determine if the driver has been looking at the display for greater than a threshold amount of time (e.g., by periodically verifying that the driver is still looking at the region of interest associated with the display). If vehicle computing system 104 determines that the driver has been looking at the display for greater than the threshold amount of time, vehicle computing system 104 may cease outputting information at the display, may output a warning message at the display, or may cease processing user inputs received by vehicle computing system 104. If vehicle computing system determines that the driver has not been looking at the display for greater than the threshold amount of time, vehicle computing system 104 may refrain from performing an action based on the driver looking at the region of interest associated with the display. In this way, vehicle computing system 104 may selectively perform actions based on the region of interest at which an occupant of the vehicle is looking.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, ultra Blu-ray, etc. where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   obtaining, via a camera system of a vehicle, at least one image of a driver of the vehicle;
   determining, based on the at least one image of the driver, a location of one or more eyes of the driver within the vehicle;
   determining, based on the at least one image of the driver, an eye gaze vector;
   determining, based on the eye gaze vector, the location of the one or more eyes of the driver, and a vehicle data file of the vehicle, a region of interest in an interior of the vehicle from a plurality of regions of interests in the interior of the vehicle, wherein the vehicle data file specifies respective locations of each of the plurality of regions of interest in the interior of the vehicle, wherein the vehicle data file includes a respective set of coordinates for each region of interest from the plurality of regions of interest, and wherein each of the respective coordinate sets are defined relative to a centroid of a sphere that encompasses the interior of the vehicle, and wherein each of the respective sets of coordinate define a two-dimensional plane; and
   responsive to determining that the region of interest is associated with a low level of driver engagement, outputting a warning message reminding the driver to pay attention to the road.

2. The method of claim 1, wherein determining the eye gaze vector comprises:
   identifying one or more facial landmarks in the at least one image;
   determining, based on the one or more facial landmarks, a pitch angle, a roll angle, and a yaw angle of a facial plane of the driver; and
   determining, based on the pitch angle, the roll angle, and the yaw angle, the eye gaze vector.

3. The method of claim 1, wherein determining the eye gaze vector comprises:

determining, based on the at least one image, an angle of at least one pupil the driver; and determining, based on the angle of the at least one pupil, the eye gaze vector.

4. The method of claim 1, wherein determining the eye gaze vector comprises:

determining, based on the at least one image, a facial plane of the driver;

determining, based the facial plane, a first initial eye gaze vector;

determining, based on the image and using eye tracking, a second initial eye gaze vector; and determining the eye gaze vector by at least combining the first initial eye gaze vector and the second initial eye gaze vector.

5. The method of claim 1, wherein determining the eye gaze vector comprises:

applying at least one machine-learned model to the at least one image, wherein the machine-learned model outputs the eye gaze vector.

6. The method of claim 1, wherein the at least one image comprises at least one respective image captured by each of two or more different cameras of the camera system, and wherein determining the location of the one or more eyes of the driver within the vehicle comprises:

determining, based on the at least one respective image captured by each of the two or more different cameras, a parallax angle;

determining, based on respective locations of each of the two or more different cameras and the parallax angle, a distance from at least one of the two or more different cameras to the one or more eyes of the driver; and determining, based on the distance and the respective locations of each of the two or more different cameras, the location of the one or more eyes of the driver.

7. The method of claim 1, wherein the at least one image comprises an image captured using an infrared camera of the camera system, and wherein determining the location of the one or more eyes of the driver within the vehicle comprises:

determining, based on distortion of the image, a distance from the infrared camera to the one or more eyes of the driver; and determining, based on the location of the infrared camera and the distance, the location of the one or more eyes of the driver.

8. The method of claim 1, wherein the location of the one or more eyes of the driver within the vehicle is specified using a camera-based coordinate system having one camera of the camera system as a centroid, wherein the respective locations of each of the plurality of regions of interest are specified using a vehicle-based coordinate system having a centroid located in an interior of the vehicle and is different from the location of the one camera, and wherein determining the region of interest at which the driver is looking comprises:

transforming the location of the one or more eyes from the camera-based coordinate system to the vehicle-based coordinate system;

determining whether a projection of the eye gaze vector from the location of the one or more eyes specified using the vehicle-based coordinate system intersects with any of the plurality of regions of interest; and responsive to determining that the eye gaze vector intersects a particular region of interest from the plurality of regions of interest, determining that the particular region of interest is the region of interest at which the driver is looking.

9. The method of claim 1, wherein the vehicle data file includes data structured in accordance with extensible markup language.

10. A computing system comprising:

at least one processor;

a camera system; and memory comprising instructions that, when executed by the at least one processor, cause the at least one processor to:

obtain, via the camera system, at least one image of a driver of a vehicle;

determine, based on the at least one image of the driver, a location of one or more eyes of the driver within the vehicle;

determine, based on the at least one image of the driver, an eye gaze vector;

determine, based on the eye gaze vector, the location of the one or more eyes of the driver, and a vehicle data file of the vehicle, a region of interest in an interior of the vehicle from a plurality of regions of interests in the interior of the vehicle, wherein the vehicle data file specifies respective locations of each of the plurality of regions of interest in the interior of the vehicle, wherein the vehicle data file includes a respective set of coordinates for each region of interest from the plurality of regions of interest, and wherein each of the respective coordinate sets are defined relative to a centroid of a sphere that encompasses the interior of the vehicle, and wherein each of the respective sets of coordinate define a two-dimensional plane; and output a warning message reminding the driver to pay attention to the road in response to a determination that the region of interest is associated with a low level of driver engagement.

11. The computing system of claim 10, wherein the instructions are executable by the at least one processor to determine the eye gaze vector by at least being executable to:

identify one or more facial landmarks in the at least one image;

determine, based on the one or more facial landmarks, a pitch angle, a roll angle, and a yaw angle of a facial plane of the driver; and determine, based on the pitch angle, the roll angle, and the yaw angle, the eye gaze vector.

12. The computing system of claim 10, wherein the instructions are executable by the at least one processor to determine the eye gaze vector by at least being executable to:

determine, based on the at least one image, an angle of at least one pupil the driver; and determine, based on the angle of the at least one pupil, the eye gaze vector.

13. The computing system of claim 10, wherein the instructions are executable by the at least one processor to determine the eye gaze vector by at least being executable to:

determine, based on the at least one image, a facial plane of the driver;

determine, based the facial plane, a first initial eye gaze vector;

determine, based on the image and using eye tracking, a second initial eye gaze vector; and determine the eye gaze vector by at least combining the first initial eye gaze vector and the second initial eye gaze vector.

14. The computing system of claim 10, wherein the instructions are executable by the at least one processor to determine the eye gaze vector by at least being executable to:
apply at least one machine-learned model to the at least one image, wherein the machine-learned model outputs the eye gaze vector.

15. The computing system of claim 10, wherein:
the camera system includes two or more different cameras;
the at least one image comprises at least one respective image captured by each of the two or more different cameras; and
the instructions are executable by the at least one processor to determine the location of the one or more eyes of the driver within the vehicle by at least being executable to:
determine, based on the at least one respective image captured by each of the two or more different cameras, a parallax angle;
determine, based on respective locations of each of the two or more different cameras and the parallax angle, a distance from at least one of the two or more different cameras to the one or more eyes of the driver; and
determine, based on the distance and the respective locations of each of the two or more different cameras, the location of the one or more eyes of the occupant.

16. A non-transitory computer-readable storage medium comprising instructions that, when executed by at least one processor of a computing system, cause the at least one processor to:
obtain, via a camera system of the computing system, at least one image of a driver of a vehicle;
determine, based on the at least one image of the driver, a location of one or more eyes of the driver within the vehicle;
determine, based on the at least one image of the driver, an eye gaze vector;
determine, based on the eye gaze vector, the location of the one or more eyes of the driver, and a vehicle data file of the vehicle, a region of interest in the interior of the vehicle from a plurality of regions of interests in the interior of the vehicle, wherein the vehicle data file specifies respective locations of each of the plurality of regions of interest in the interior of the vehicle, wherein the vehicle data file includes a respective set of coordinates for each region of interest from the plurality of regions of interest, and wherein each of the respective coordinate sets are defined relative to a centroid of a sphere that encompasses the interior of the vehicle, and wherein each of the respective sets of coordinate define a two-dimensional plane; and
output a warning message reminding the driver to pay attention to the road in response to a determination that the region of interest is associated with a low level of driver engagement.

17. The non-transitory computer-readable storage medium of claim 16, wherein the instructions are executable by the at least one processor to determine the eye gaze vector by at least being executable to:
identify one or more facial landmarks in the at least one image;
determine, based on the one or more facial landmarks, a pitch angle, a roll angle, and a yaw angle of a facial plane of the driver; and
determine, based on the pitch angle, the roll angle, and the yaw angle, the eye gaze vector.

18. The non-transitory computer-readable storage medium of claim 16, wherein the instructions are executable by the at least one processor to determine the eye gaze vector by at least being executable to:
determine, based on the at least one image, an angle of at least one pupil the driver; and
determine, based on the angle of the at least one pupil, the eye gaze vector.

19. The non-transitory computer-readable storage medium of claim 16, wherein the instructions are executable by the at least one processor to determine the eye gaze vector by at least being executable to:
determine, based on the at least one image, a facial plane of the driver;
determine, based the facial plane, a first initial eye gaze vector;
determine, based on the image and using eye tracking, a second initial eye gaze vector; and
determine the eye gaze vector by at least combining the first initial eye gaze vector and the second initial eye gaze vector.

20. The non-transitory computer-readable storage medium of claim 16, wherein the instructions are executable by the at least one processor to determine the eye gaze vector by at least being executable to:
apply at least one machine-learned model to the at least one image, wherein the machine-learned model outputs the eye gaze vector.

* * * * *